United States Patent [19]
Ream et al.

[11] Patent Number: 6,031,199
[45] Date of Patent: Feb. 29, 2000

[54] COMBINATION LASER CUTTING AND BLANK WELDING APPARATUS AND METHOD

[75] Inventors: Stanley L. Ream, Novi, Mich.; Robert J. Beeson, Columbus; Jason P. Isaacs, Marysville, both of Ohio

[73] Assignee: Worthington Machine Technology, Columbus, Ohio

[21] Appl. No.: 08/959,043

[22] Filed: Oct. 28, 1997

[51] Int. Cl.[7] .................................................. B23K 26/00
[52] U.S. Cl. ................................ 219/121.63; 219/121.64
[58] Field of Search ........................ 219/121.63, 121.64, 219/121.82; 228/44.3, 4.1, 6.1, 212, 5.1

[56] References Cited

U.S. PATENT DOCUMENTS

| | | | |
|---|---|---|---|
| 3,647,131 | 3/1972 | Hahne | 228/5.1 |
| 4,650,954 | 3/1987 | Frings et al. | |
| 4,827,100 | 5/1989 | Frings et al. | |
| 4,854,493 | 8/1989 | Fujii et al. | 228/44.3 |
| 4,902,872 | 2/1990 | Frings et al. | |
| 5,023,427 | 6/1991 | Neiheisel et al. | 219/121.82 |
| 5,045,668 | 9/1991 | Neiheisel et al. | 219/121.63 |
| 5,142,118 | 8/1992 | Schlatter | |
| 5,229,571 | 7/1993 | Neiheisel | |
| 5,245,156 | 9/1993 | Kamogawa et al. | 219/121.64 |
| 5,250,783 | 10/1993 | Nishi et al. | 219/121.64 |
| 5,266,770 | 11/1993 | Noe | 219/121.63 |
| 5,324,913 | 6/1994 | Oberg et al. | |
| 5,550,345 | 8/1996 | Meier et al. | |
| 5,591,358 | 1/1997 | Quagline | |
| 5,630,269 | 5/1997 | Wasserbaech et al. | 228/44.3 |
| 5,814,786 | 9/1998 | Johnson et al. | 219/121.64 |
| 5,878,944 | 3/1999 | Aebersold et al. | 228/212 |

FOREIGN PATENT DOCUMENTS

| | | |
|---|---|---|
| 4222025 | 1/1994 | Germany . |
| 4324938 | 1/1995 | Germany ............................ 219/121.63 |
| 60-96386 | 5/1985 | Japan .................................. 219/121.64 |
| 60-115388 | 6/1985 | Japan .................................. 219/121.63 |

OTHER PUBLICATIONS

Advanced Materials and Processes, "Laser Cutting and Welding Combined to Join Large Sheets," Jan., 1996, p. 18.

Industrial Laser Review, "Cutting and Welding Large Sheets," Jan., 1996, pp. 12–13.

TechComm Associates, "Laser Cutting and Welding System for Joining Large Sheets," by Walter Tamaschke, date unknown.

*Primary Examiner*—Geoffrey S. Evans
*Attorney, Agent, or Firm*—Fay, Sharpe. Fagan, Minnich & McKee, LLP

[57] ABSTRACT

A combination cutting and welding apparatus for fabricating tailor welded blanks and the like wherein sheets of metal are placed end-to-end in an abutting relationship and welded together along the resulting seam to form a blank for subsequent metal processing. The machine includes two halves which are positioned relative to each other in either a cutting position or a welding position. Each half secures a sheet metal workpiece. At least one of the workpieces is cut so that the workpieces respectively secured by the first and second halves include adjacent edges that mate when the halves are moved from the cutting to the welding position. The workpieces are not unclamped between cutting and welding operations to facilitate the precise mating of the workpiece forward edges. The halves of the apparatus are able to communicate workpieces and finished blanks to each other via crossover conveyor assemblies that allow the workpieces and finished blanks to span a space between the halves. Sensing and positioning assemblies accurately position the workpieces for cutting operations. Offal supports are selectively deployed to support the offal formed by cutting.

17 Claims, 22 Drawing Sheets

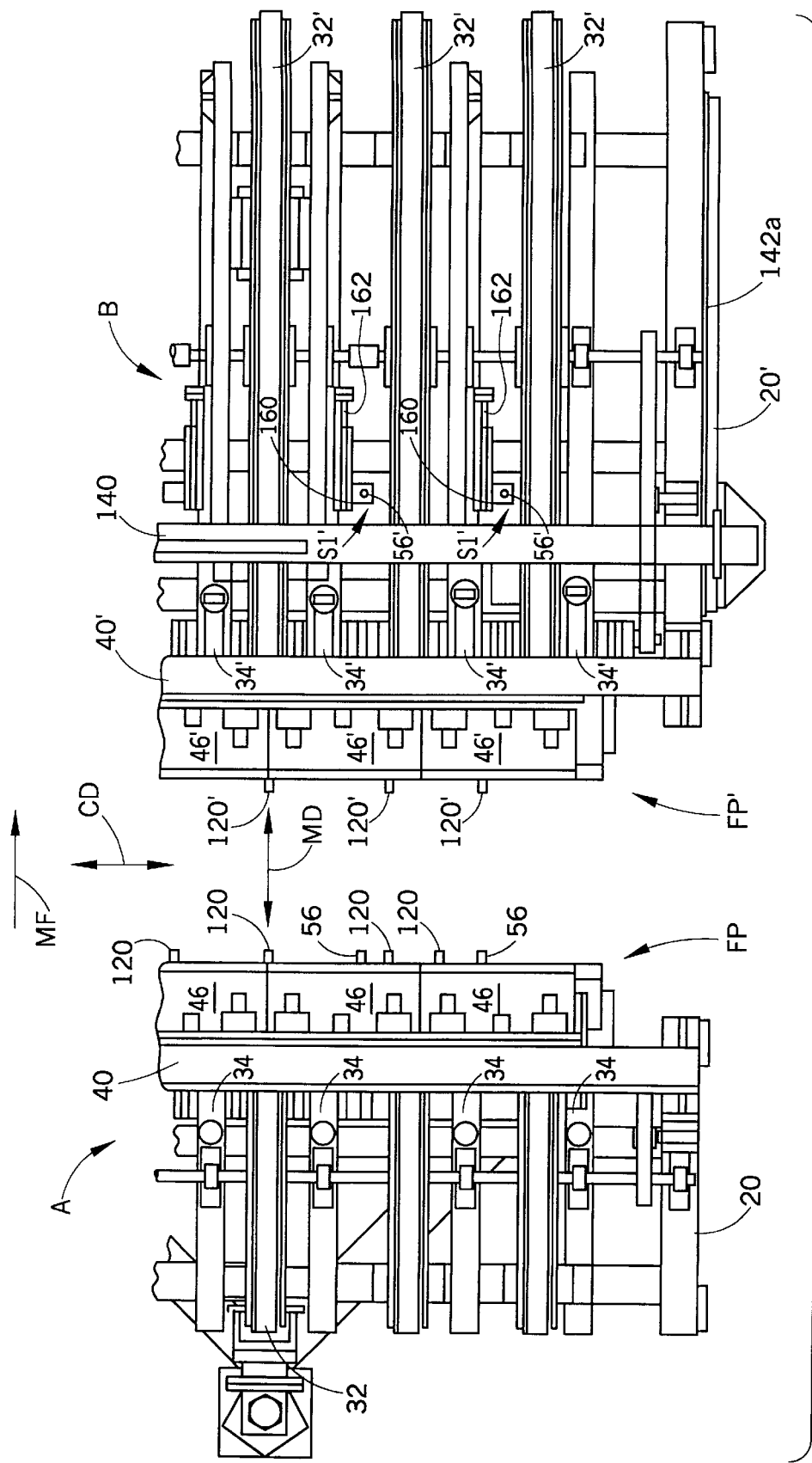

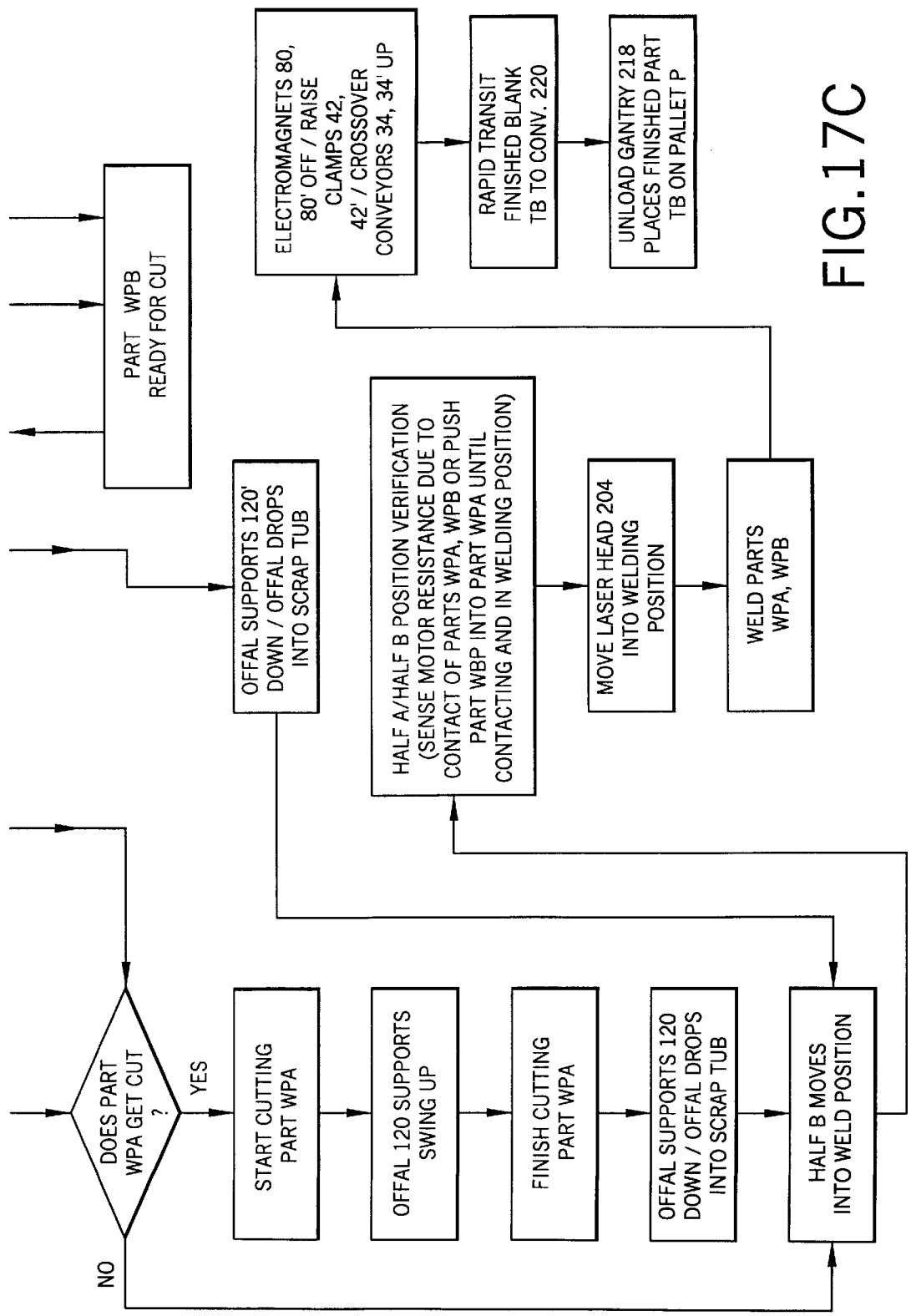

COMBINATION LASER CUTTING AND BLANK WELDING APPARATUS AND METHOD

BACKGROUND OF THE INVENTION

This invention relates to a metal working apparatus and method. More specifically, the present invention relates to a combination cutting and welding apparatus for fabricating tailor welded blanks and the like wherein sheets of metal are placed end-to-end in an abutting relationship and welded together along the resulting seam to form a blank for subsequent metal processing.

Tailor welded blanks are well known in the art and are formed by two or more sheets of steel that have been joined by a welding process. The sheets are typically joined to produce a blank from sheets having dissimilar thicknesses, strengths or other physical properties, or different coatings. Alternatively, the tailor welded blanks are formed from the same gauge of metal to produce oversize blanks and to eliminate waste of raw materials. Any conventional welding source may be used to form the weld between the sheets.

Tailor blank welding apparatus and methods have been the subject of various U.S. Patents. While many of these prior tailor welded blank forming devices and methods have been found to be generally effective, there has been found an ever increasing need for faster and higher quality welded blank production.

Most recently, the use of lasers to weld steel sheets to form tailor welded blanks has become popular. Laser welding is typically accomplished autogenously, i.e., without the addition of filler material to the weld seam or joint. The focused laser beam is delivered to the seam between the abutted parts, and the energy of the laser beam causes the parts to become fused together along the seam. While laser welding is generally very effective, it requires the workpieces to be: 1) well prepared; 2) securely fixed in position; 3) in close proximity with one another; and, 4) at a known location. In particular, it is critical that the workpieces precisely fit together along the weld joint. For example, when welding sheet metal with lasers, variations as small as 0.1 mm can decrease weld quality and reduce welding speed.

Traditional edge preparation for laser welding of sheet metal is accomplished by shearing or blanking the individual sheets in a die set. These mechanical processes produce distorted edges that are not ideal for laser welding. Further, the planar accuracy of a mechanically prepared edge is subject to flatness, hardness and residual stress in the "parent" or raw material. For example, wavy steel parent material will yield a different cut edge relative to flat steel parent material, even when cut by the same shear or die. Therefore, a need has been found for an apparatus and method that produce tailor welded blanks from at least two sheets of a metal, wherein the edge of at least one of the sheets along the weld joint is prepared to have improved planar accuracy independent of the flatness, hardness, and stress condition of the incoming or parent sheet of metal.

Another strict requirement associated with laser welding of tailor blanks is that the edges to be welded must be fixed securely relative to each other, in close proximity, at known locations, and with accurate planar positioning. The greater the fixturing accuracy and repeatability, the higher the welding speed and weld accuracy will be. Known tailor blank welding machines do not provide the needed part movement capabilities with fixturing accuracy and repeatability.

Of course, another important aspect of any production welding system is the ability to load, fix precisely in position, and unload parts in a rapid, reliable, and repeatable manner. Also, the components used to move parts, fix parts into position, and to gauge the position of parts must be adequately protected from welding operations. As such, known tailor blank welding machines have not been found to be completely satisfactory in this regard. Further improvements in quality and speed, along with more efficient material flow, is always desired to reduce waste and cost.

It has been proposed to form butt welds of similar steel parts for railroad cars using a laser, first to cut and then to weld the parts. The parts are secured, laser cut to conform to each other along the weld joint, abutted to each other, and laser welded to form a finished railroad car component. However, there is no known apparatus for fabricating tailor welded blanks in this manner, and further, no known apparatus addresses all of the above-noted cutting, welding, and material flow considerations.

Accordingly, it has been considered desirable to develop a new and improved apparatus and method for laser cutting and welding of tailor welded blanks which would overcome the foregoing difficulties and others while providing better and more advantageous overall results.

SUMMARY OF THE INVENTION

In accordance with the present invention, a new and improved laser cutting and blank welding apparatus and method are provided for fabricating tailor welded blanks.

In accordance with a first aspect of the present invention, a laser cutting and blank welding apparatus for fabricating a tailor welded blank from at least first and second dissimilar or similar sheet metal workpieces includes first and second machine halves. At least one of the halves is movable along a first axis relative to the other so that forward portions of each are selectively positioned in one of an axially spaced cutting relationship for cutting operations and an axially adjacent welding relationship for welding operations. Each of the halves includes a transport surface for moving an associated workpiece on a first axis, a first sensing and positioning assembly for sensing and controlling the position of the associated workpiece on the first axis, a lateral sensing and positioning assembly for sensing and controlling the lateral position of the associated workpiece on the transport surface, and, a workpiece clamping assembly located at the forward portion for securely clamping the associated workpiece to prevent movement thereof and such that adjacent edges of two associated workpieces abut when the halves are positioned the welding relationship. The apparatus further includes a laser beam cutting and welding device supported above and axially between the first and second halves for cutting at least one of the two associated workpieces so that the adjacent edges of the two associated workpieces mate when the machine halves are positioned in the welding position. The laser beam cutting and welding device further welds the two associated workpieces together along the adjacent edges of the two associated workpieces when the halves are in the welding position.

In accordance with another aspect of the invention, a method of cutting and welding sheet metal blanks includes securing first and second sheet metal workpieces to respective first and second support members which are located in an axially spaced relationship relative to each other. At least one of the workpieces is then cut so that the workpieces have mating adjacent edges. Without unsecuring the first and second workpieces relative to their respective support members, at least one of the first and second support members is moved into an axially adjacent relationship with the other support member so that the adjacent edges of the workpieces mate to form a welding joint. The workpieces are then welded together along the welding joint to form a tailor welded blank.

One advantage of the present invention is the provision of a new and improved laser cutting and blank welding apparatus and method for producing tailor welded blanks.

Another advantage of the present invention is the provision of an apparatus and method for producing high quality tailor welded blanks through improved edge preparation of the incoming metal sheet, independent of the flatness, hardness, or stress condition thereof.

Still another advantage of the present invention is the provision of an apparatus and method for producing tailor welded blanks wherein the sheet metal edges to be welded are accurately, repeatably, and securely fixtured.

Yet another advantage of the present invention is the provision of a tailor welded blank producing apparatus and method wherein the sheet metal workpieces are not unclamped between the cutting and welding operations.

A further advantage of the present invention is the provision of a tailor welded blank producing apparatus and method wherein material flow of the parts and finished welded blanks is optimized for improved efficiency.

A still further advantage of the present invention is the provision of a laser cutting and blank welding apparatus having first and second halves for respectively supporting first and second metal sheets to be welded, wherein one of the halves is fixed and the other is movable.

A yet further advantage of the present invention is the provision of a laser cutting and blank welding apparatus including first and second halves for respectively supporting first and second metal sheets to be welded, wherein the second sheets and the finished welded blanks (produced by welding the first and second sheets together) are easily and efficiently conveyed across a space between the first and second halves.

Another advantage of the present invention is the provision of a laser cutting and blank welding apparatus including three-point workpiece sensing and positioning capabilities for accurate and repeatable workpiece positioning.

Still another advantage of the present invention is the provision of a laser cutting and blank welding apparatus including an offal support mechanism that improves laser cutting performance.

Still other benefits and advantages of the present invention will become apparent to those of ordinary skill in the art upon reading and understanding the following detailed specification.

BRIEF DESCRIPTION OF THE DRAWINGS

The invention may take physical form in certain parts and arrangements of parts, and may be carried out in certain steps and arrangements of steps, preferred embodiments of which are described in detail in this specification and illustrated in the accompanying drawings which form a part hereof and wherein:

FIG. 10A shows a partial top plan view of the stationary and moving halves operatively positioned relative to each other;

DETAILED DESCRIPTION OF THE PREFERRED EMBODIMENTS

Figure 1:
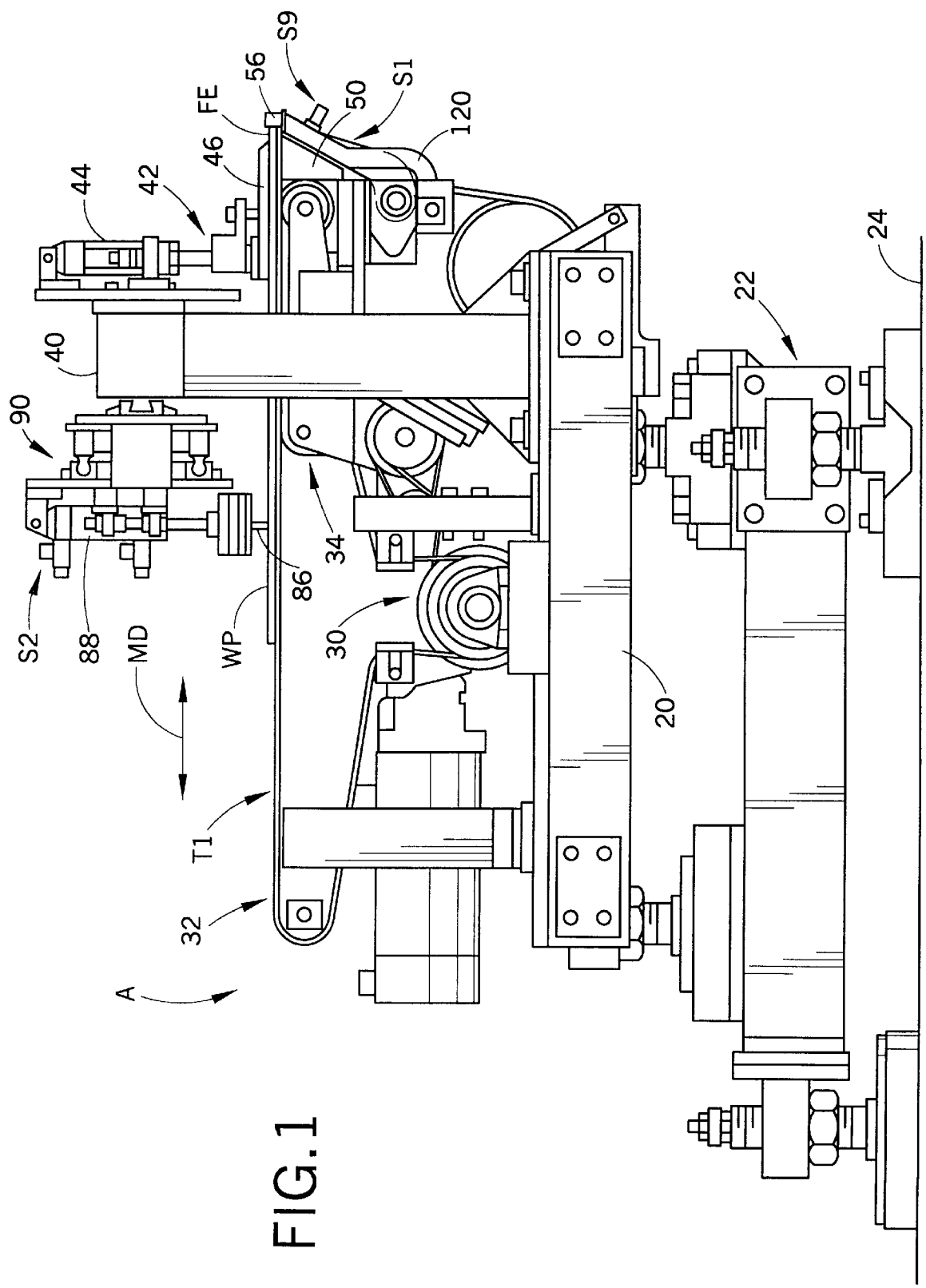
FIG. 1 is a side elevational view of a stationary half of a conveying and fixturing apparatus in accordance with the present invention.

Referring now to the FIGURES wherein the showings are for purposes of illustrating preferred embodiments of the present invention only and not for purposes of limiting the same, FIG. 1 shows a first stationary portion or "half" A of a laser cutting and blank welding apparatus in accordance with the present invention. Stationary half A includes a frame or chassis 20 mounted on a three-point mounting base 22 which is, in turn, securely located on a support surface 24 such as a shop floor. The three-point mounting base provides a highly stable base upon which the stationary half A is releasably yet securely mounted.

The chassis 20 supports a conveyor drive source 30, such as an electric motor, which drives at least one, and preferably a plurality of first conveyors forming a conveyor assembly 32. The drive source 30 is also operatively connected with at least one, and preferably a plurality of second, tiltable or pivotable "crossover" conveyors forming a crossover conveyor assembly 34. The conveyor assemblies 32,34 cooperate to define a transport surface T1 which moves metallic workpieces WP in a machine direction MD. Preferably, the conveyor assembly 32 is selectively magnetized (e.g., using known magnetic conveyors) to attract a metallic workpiece WP positioned thereon to eliminate slippage thereof.

Figure 2:
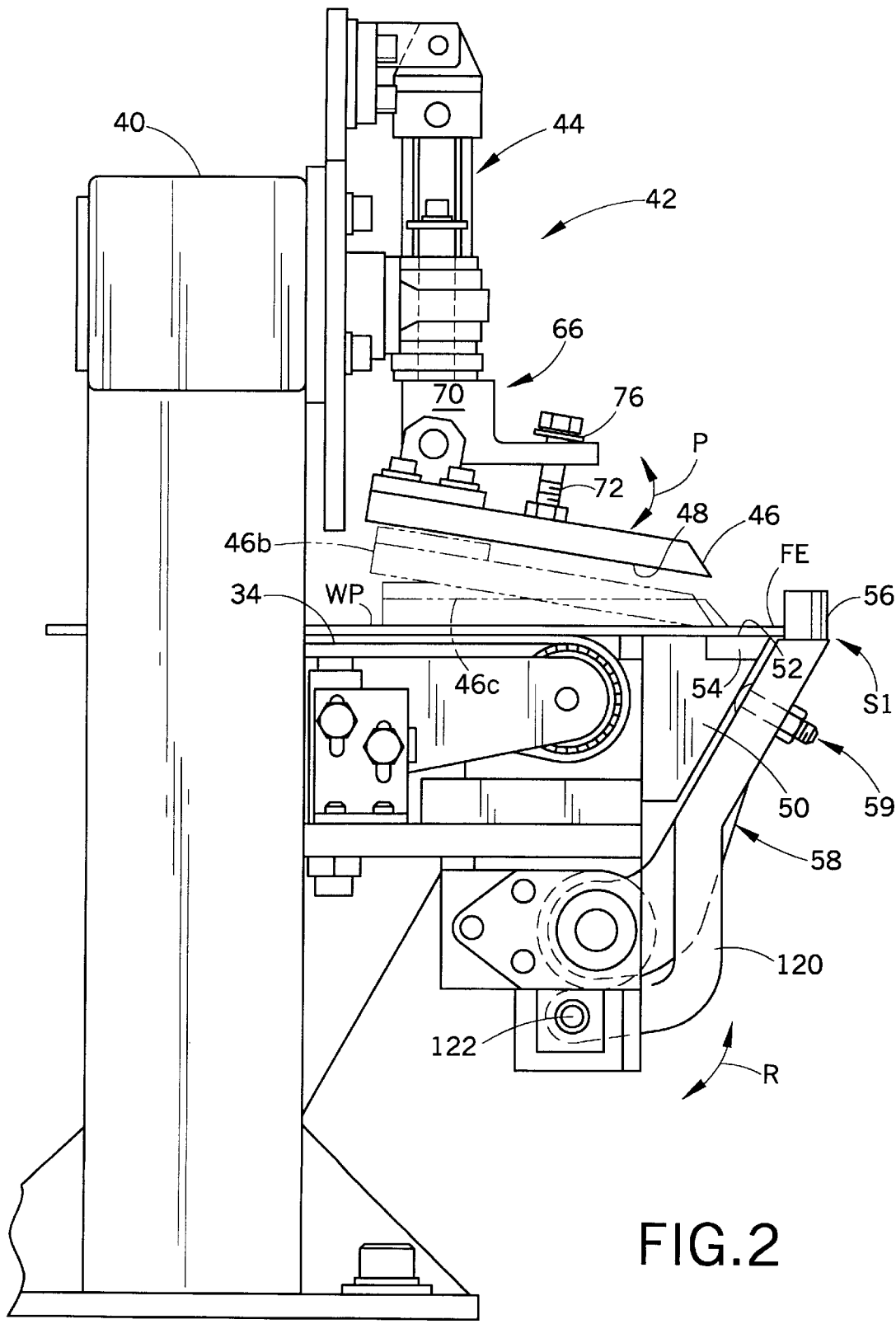
FIG. 2 is an enlarged side elevational view of a front end of the stationary apparatus half of FIG. 1 showing an open position and, in phantom, a closed position of a sheet metal clamp for fixturing a workpiece.
Figure 3:
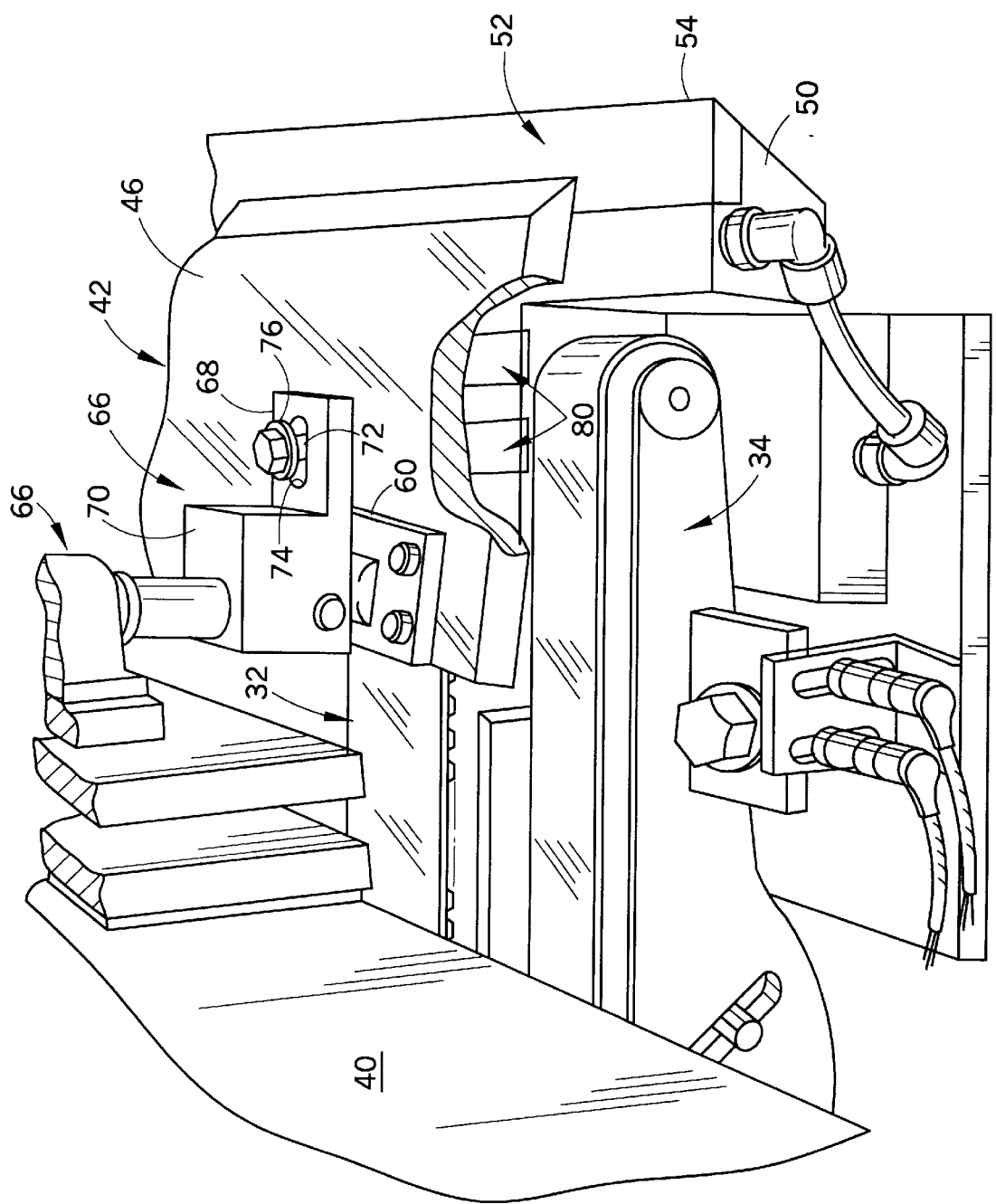
FIG. 3 is a perspective view of a portion of the stationary half of the apparatus shown in FIG. 1, with a portion broken away to reveal one of a plurality of electromagnets used for part fixturing.

The chassis 20 also supports an overhead beam 40 or similar overhead support structure which extends across the entire width of the stationary half A. The beam 40 carries a workpiece clamping assembly 42 on a forward side thereof. With reference also to FIGS. 2 and 3, the workpiece clamping assembly 42 comprises at least one, and preferably, a plurality of actuators 44 operatively connected to one or more clamping plates 46. The actuators are preferably hydraulic, pneumatic, or other fluid cylinders, although other means, such as electric motors or the like, may alternatively be used. With particular reference to FIG. 2, the actuators 44 operate to control the vertical position of the clamping plates 46. The actuators 44 move the plates 46 between an open or unclamped position (shown in solid lines at 46) whereby a workpiece WP is able to move on the conveyors 32,34 beneath the plates 46, and a closed or clamped position (shown in phantom lines at 46c) whereby a workpiece WP is immovably clamped between a lower surface 48 of each plate 46 and a support member 50 having a support surface 52. The support surface 52 is defined at a leading or forward portion thereof by a laser cutting and welding block 54, preferably made from copper or another laser resistant material, forming a part of the support member 50.

As is also shown in FIG. 2, when the actuators 44 move the clamping plates 46 from the unclamped position to the clamped position, the plates 46 move both downward (shown in phantom at 46b) and forward (shown in phantom at 46c). This combined downward and forward clamping movement of each clamping plate 46 ensures that a workpiece WP does not move rearward out of an abutting relationship with one or more sensors 56 of a sensor assembly S1 that sense the front edge FE of the workpiece as is described in full detail below. Thus, the clamping action of the plates ensures that the workpiece WP is accurately, securely, and repeatably fixed in position for subsequent operations.

Figure 5:
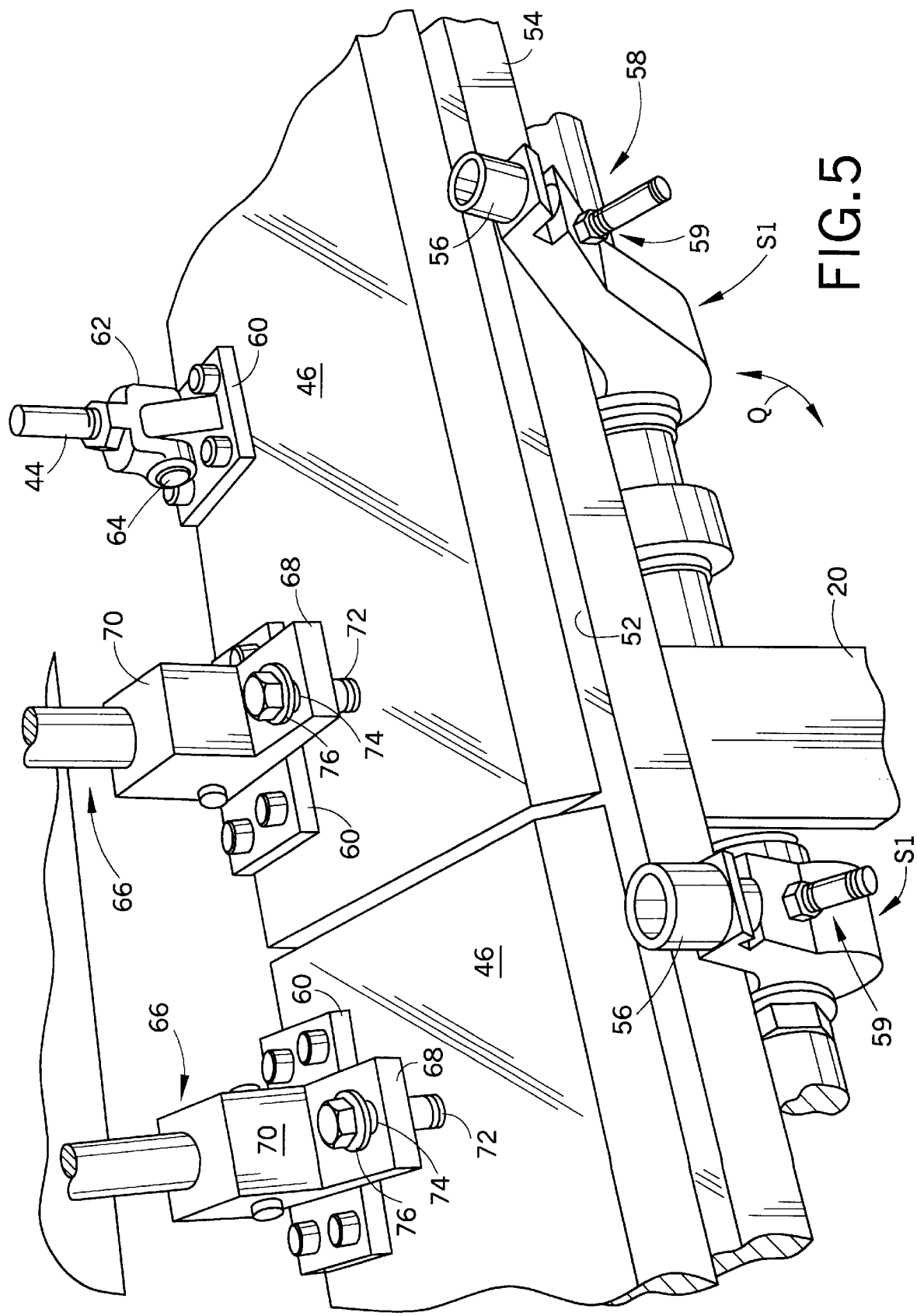
FIG. 5 is a perspective view of a two-point front edge sensor assembly of the stationary half of FIG. 1.

With particular reference to FIG. 5, each clamping plate 46 includes one or more attachment members 60 securely connected thereto. Correspondingly, each actuator 44 includes a mating attachment member 62 positioned on a distal end thereof. A hinge pin 64 or the like is used to pivotally interconnect the attachment members 60,62, and thus, the clamping plates 46 to one or more actuators 44. Each clamping plate 46 pivots on the hinge 64 along an arc P (FIG. 2).

With continuing reference to FIG. 5, in addition to being pivotally connected to the actuators 44, each plate 46 is also preferably similarly pivotally connected to a guide rail assembly 66 such as a linear bearing assembly that limits any unwanted movement of the plate 46, i.e., movement other than vertical movement or pivotal movement along the arc P. Further, as is best seen in FIG. 3, upward movement of each plate 46 along the arc P is limited by a stop portion 68 of each guide rail assembly attachment member 70 which interconnects the guide rail assembly 66 to its respective plate 46. To limit downward movement of each plate 46 along the arc P, each plate 46 includes at least one stop pin 72 extending upward therefrom and through an elongated aperture 74 formed in its associated attachment member 70. A radially enlarged portion or head 76 of each pin 72 limits downward movement of the pin 72 through the aperture 74 to consequently limit downward movement of the plate 46. Each pin 72 is threadably or otherwise adjustably attached to its respective plate 46 so that the axial length of each pin, and thus the amount of travel of each plate 46 along the arc P, is adjustable.

It can also be seen in FIG. 3 that one or more selectively energized electromagnets 80 are positioned adjacent the support member 50, at a level equal to or slightly beneath the elevation of the workpiece support surface 52 thereof. Preferably, at least one magnet 80 is provided in association with each clamping plate 46. Each magnet 80 may be selectively energized to attract the workpiece WP once the workpiece is properly located for the cutting and/or welding operations. The magnetic attraction between the workpiece WP and the one or more magnets 80 helps to prevent movement of the workpiece during clamping operations. Further, to fix the workpiece in position during actual cutting and/or welding operations, the clamping magnets 80 provide additional fixturing force relative to any purely mechanical clamping action of the plates 46. Also, the clamping plates 46 themselves are a ferromagnetic material (e.g., steel) of sufficient thickness, especially relative to a thin metal workpiece, such as a sheet steel workpiece, and therefore, the workpiece WP is effectively "sandwiched" between the surface 52 of the support member 50 and the lower surface 48 of at least one clamping plate 46 which is powerfully attracted to an associated clamping magnet 80. In this manner, a workpiece is securely and accurately fixtured for cutting and/or welding operations, but is also easily released for subsequent movement as required. This "sandwiching" produces no net force which would distort the support member 50.

Referring again to FIG. 5, it can be seen that a plurality of clamping plates 46 are provided and are individually movable between the clamped and unclamped positions as described. This structure has been found to be advantageous for several reasons relative to structures wherein a single elongated clamping member is provided and extends across the entire width of the apparatus. Initially, it is noted that the preferred structure as shown allows for certain plates 46 to remain unused when smaller workpieces are being cut and welded. Also, the use of a plurality of independently actuated plates 46 is believed to provide more secure clamping of a workpiece in that each plate 46 is able to accommodate surface irregularities independent of adjacent plates. Similarly, each individual plate 46 is attracted by at least one electromagnet 80. Further, the use of a plurality of individual clamping plates 46 facilitates maintenance given that each clamping plate is individually replaceable in the event of excessive wear or damage.

Figure 6:
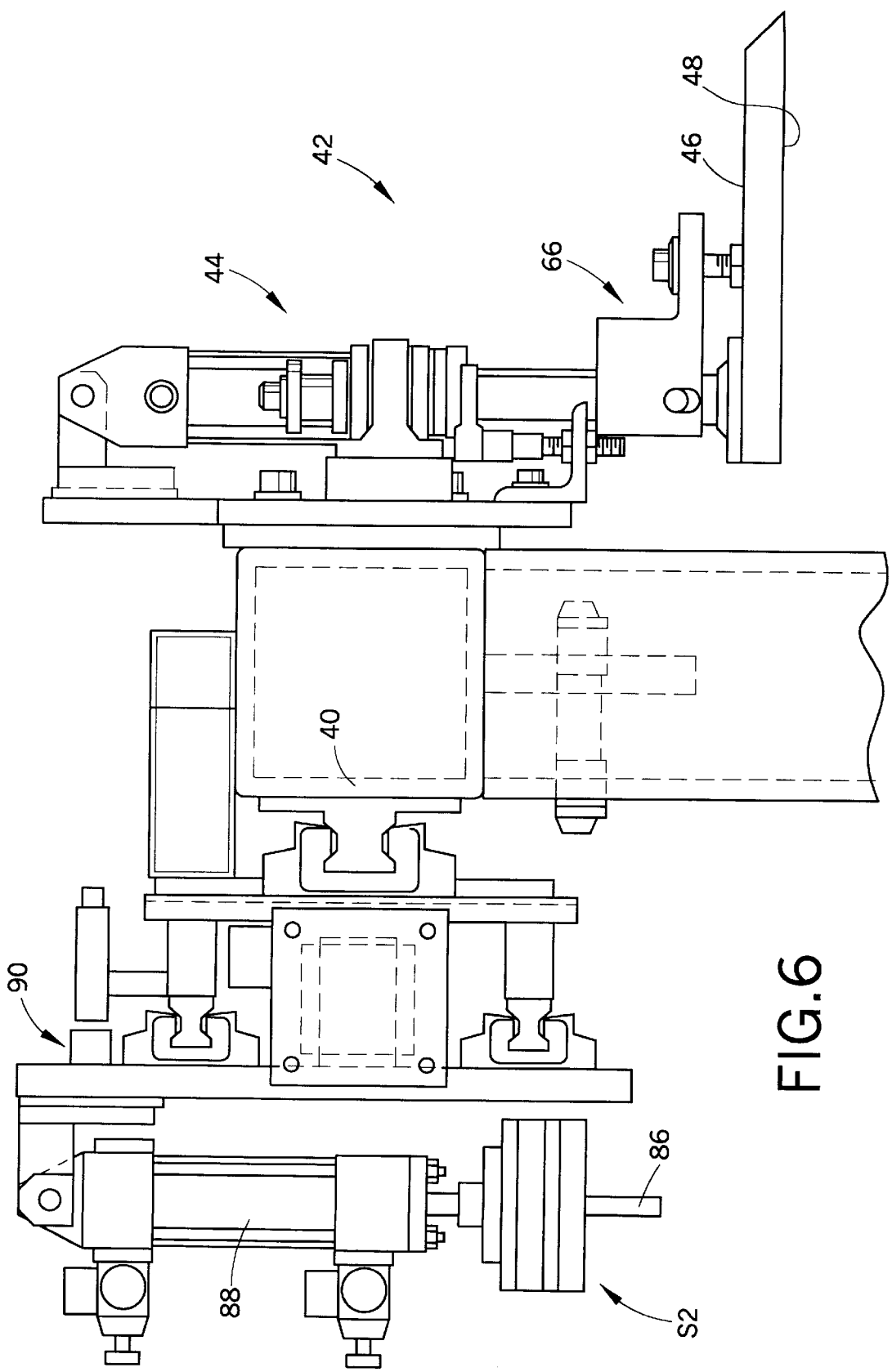
FIG. 6 is a side elevational view of a lateral edge sensor and positioning assembly in accordance with the present invention, the sensor and positioning assembly shown are connected to the stationary half of FIG. 1.

FIGS. 1 and 6 most clearly illustrate the workpiece sensing and position adjustment system of the stationary half A in accordance with the present invention. The stationary half workpiece sensing and position adjustment system comprises the aforementioned workpiece front edge sensing and position controlling assembly S1 for sensing and controlling an axial position of a front edge FE of a workpiece WP on the machine direction axis MD. Additionally, the workpiece sensing and position adjustment system includes a workpiece lateral edge sensing and positioning assembly S2 supported by the beam 40 on a rear side thereof above the workpiece transport surface T1.

Figure 5A:
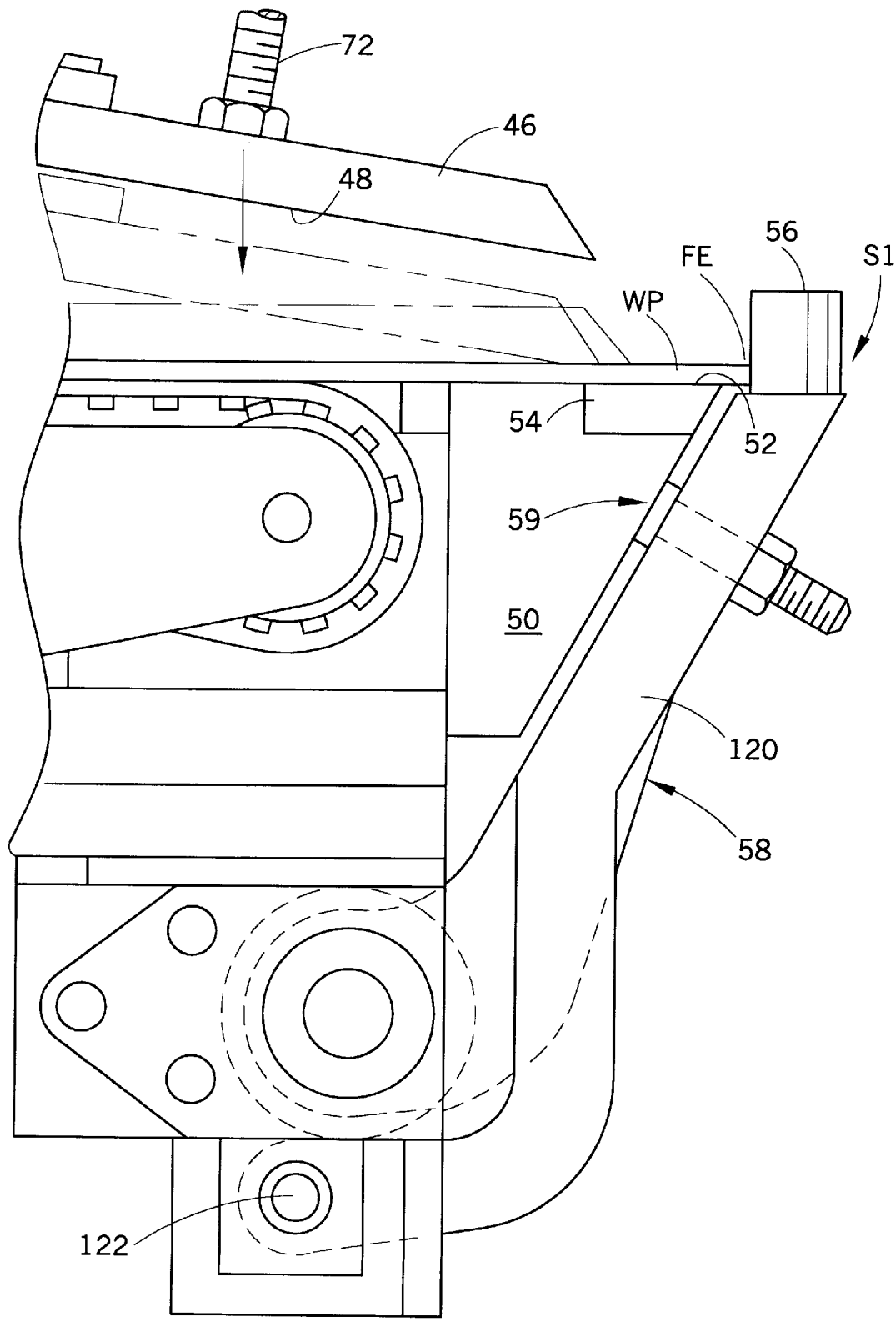
FIG. 5A is an enlarged, partial side elevational view of the forward region of the half A and the sensor assembly S1.
Figure 11A:
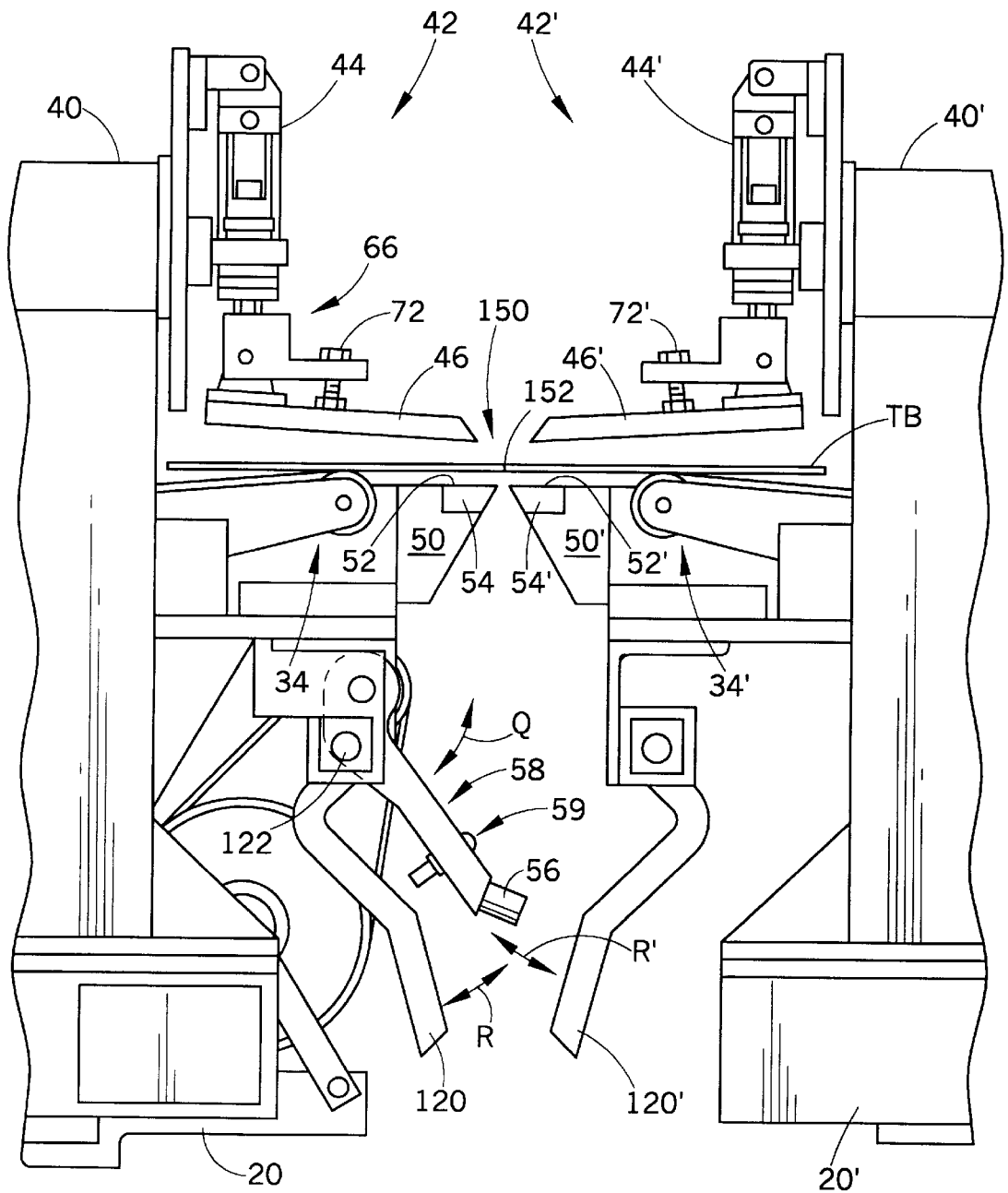
FIG. 11A is a side elevational view of the stationary and moving halves showing the crossover conveyors operatively positioned to convey a part from the stationary half to the moving half, over the gap located therebetween.

Both assemblies S1,S2 are movable between a retracted position that allows free workpiece movement and that protects the assemblies S1,S2 from damage, and an operative position for sensing, controlling, and in the case of the assembly S2, for adjusting, the position of a workpiece WP. With reference now also to FIG. 5, the gauge pins or sensors 56 of the assembly S1 are connected to a tiltable or pivotable arm assembly 58 that is pivotally supported relative to the chassis 20 for movement along an arc Q between the operative position, as shown, and a retracted position (FIG. 11A). Any suitable drive source, such as an electric motor, may be used to rotate the arm assembly 58 as described. With reference also to FIG. 5A, it is preferred that the arm assembly 58 includes dampening means to dampen the upward pivoting motion thereof to minimize wear and improve repeatability of the sensor position. The dampening means for dampening upward pivoting motion is identified by numeral 59 and includes an adjustable rod, such as by threading, which extends through the arm assembly 58 and has a resilient head which contacts the support member 50.

The workpiece sensor and position adjustment assembly S2 (FIG. 6) includes a workpiece lateral edge gauge pin or sensor 86 which is the same or similar to the front edge sensor 56 of the assembly S1. The lateral edge sensor 86 is connected to an actuator 88, such as a fluid cylinder, that moves the sensor 86 between the retracted position and the operative position (FIG. 1) for sensing the presence of and/or adjusting the lateral position of the workpiece WP on the transport surface T1. Lateral position, as used herein, describes the position of a workpiece on a cross-machine direction axis CD (FIG. 10A) which is transverse relative to the machine direction axis MD.

The assembly S2 is connected to the overhead beam 40 via a laterally movable carriage 90 that supports the actuator 88 and the sensor 86 for reciprocal lateral movement along the beam 40 under the force of a servomotor or other suitable source of power that provides for highly accurate control of the lateral position of the carriage 90. When the sensor 86 is extended to the operative position and in contact with an edge of the workpiece, further lateral movement of the carriage 90 toward or into the workpiece results in lateral movement of the workpiece on the transport surface T1 for small adjustments in its lateral position. The servomechanism moving the carriage 90 allows for highly accurate, feedback controlled movement of the carriage 90, and thus, of the workpiece WP. It is preferred that, during workpiece lateral position adjustments, the conveyors 32 are activated with their magnets "off" to urge the workpiece gently into the sensor assembly S1. In this manner, sufficient forward driving force is exerted on the workpiece, even while slipping relative to the demagnetized conveyors, so that the workpiece is not moved rearward and off of the sensors 56 during lateral edge sensing and positioning operations.

Thus, as is described below in further detail in conjunction with the method of the present invention, the assemblies S1,S2 provide a highly effective three-point sensing system for reliably and quickly positioning a workpiece at a known location. Of course, once positioned as desired, the clamping assembly 42, and the electromagnets 80, are employed to clamp the workpiece and prevent its further movement.

Figure 4:
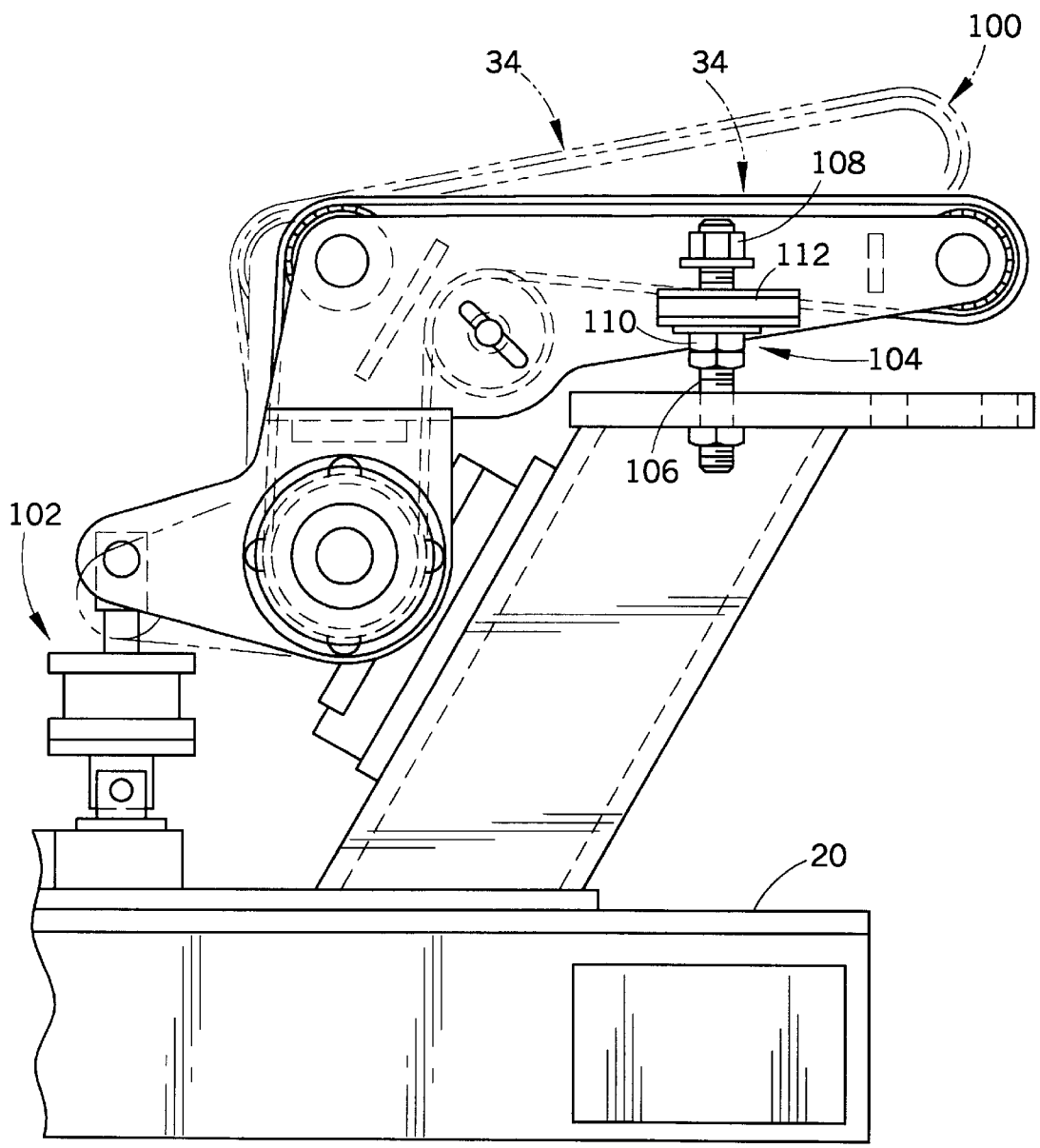
FIG. 4 is a side elevational view of a front end of the stationary half shown in FIG. 1, with portions removed to illustrate a stationary half crossover conveyor in accordance with the present invention.

FIG. 4 illustrates the tilting or pivoting action of the second or "crossover" conveyor assembly 34. As mentioned above, the stationary half A preferably includes a plurality of fixed conveyors 32 and a plurality of pivotable crossover conveyors 34. The conveyors 32,34 are positioned adjacent each other, and, together define the transport surface T1. The crossover conveyors 34, together with like crossover conveyors on a moving half of the apparatus as described below, provide a means for conveying a workpiece or a completed tailor welded blank over a space or gap between the stationary half A of the apparatus and a moving half B of the apparatus. In general, by tilting or pivoting the conveyors 34 upward to a crossover position (shown in phantom), a piece of sheet metal such as a workpiece or a finished welded blank is able to extend sufficiently far off of the leading edge 100 of the conveyor assembly 34 so that upon finally tipping under the force of gravity, it will span the gap existing between the stationary half A and an associated moving half B.

Each crossover conveyor 34 is pivotally connected to the chassis 20 and pivots between a standard position for moving a workpiece WP on the transport surface T1, and the crossover position. A crossover conveyor actuator 102 is provided in association with the crossover conveyor assembly 34. The actuator is provided by a fluid cylinder, an electric motor, a mechanism such as a cam and follower mechanism, or any other suitable structure. An adjustable stop member 104 limits and dampens the upward and downward pivoting movement of each crossover conveyor 34. The stop member 104 includes a threaded adjustment screw 106 connected to the chassis 20. Upper and lower movement limiting nuts 108,110 limit upward and downward movement of the conveyor 34, respectively. The nuts are threaded onto the screw member 106, and their position is therefore adjustable. A bushing or other shock absorbing member 112 is provided to dampen shocks and vibrations and reduce noise upon pivoting movement of the conveyor 34.

Once a workpiece of sheet steel is clamped in position as described for laser cutting and/or welding operations. The sensor assemblies S1,S2 are retracted out of their operative positions to prevent damage thereto. If a cutting operation of the workpiece WP clamped by the stationary half A is to be performed, an offal support assembly including a plurality of laterally spaced offal support arms 120 (FIGS. 2, 10A) is pivoted into the operative position such that the distal end of each support arm 120 is positioned beneath the portion of the workpiece which is being cut away from the remainder, i.e., the offal. By supporting the offal during cutting operations, a superior cut is obtained because the weight of the falling offal does not influence the cutting operations. The offal support assembly includes a sufficient number of support arms 120 to ensure that the entire offal is supported across the width of the stationary half A. Further, as with the sensor assembly S1, the offal support assembly is pivotable out of its operative position after the cutting operations are complete (FIG. 11A) to prevent damage thereto. More particularly, the offal support assembly pivots on a hinge or axle 122 along an arc R between the operative and storage positions. When pivoted to the storage position, any supported offal is dropped to the shop floor 24 or into a suitable scrap container.

Figure 7:
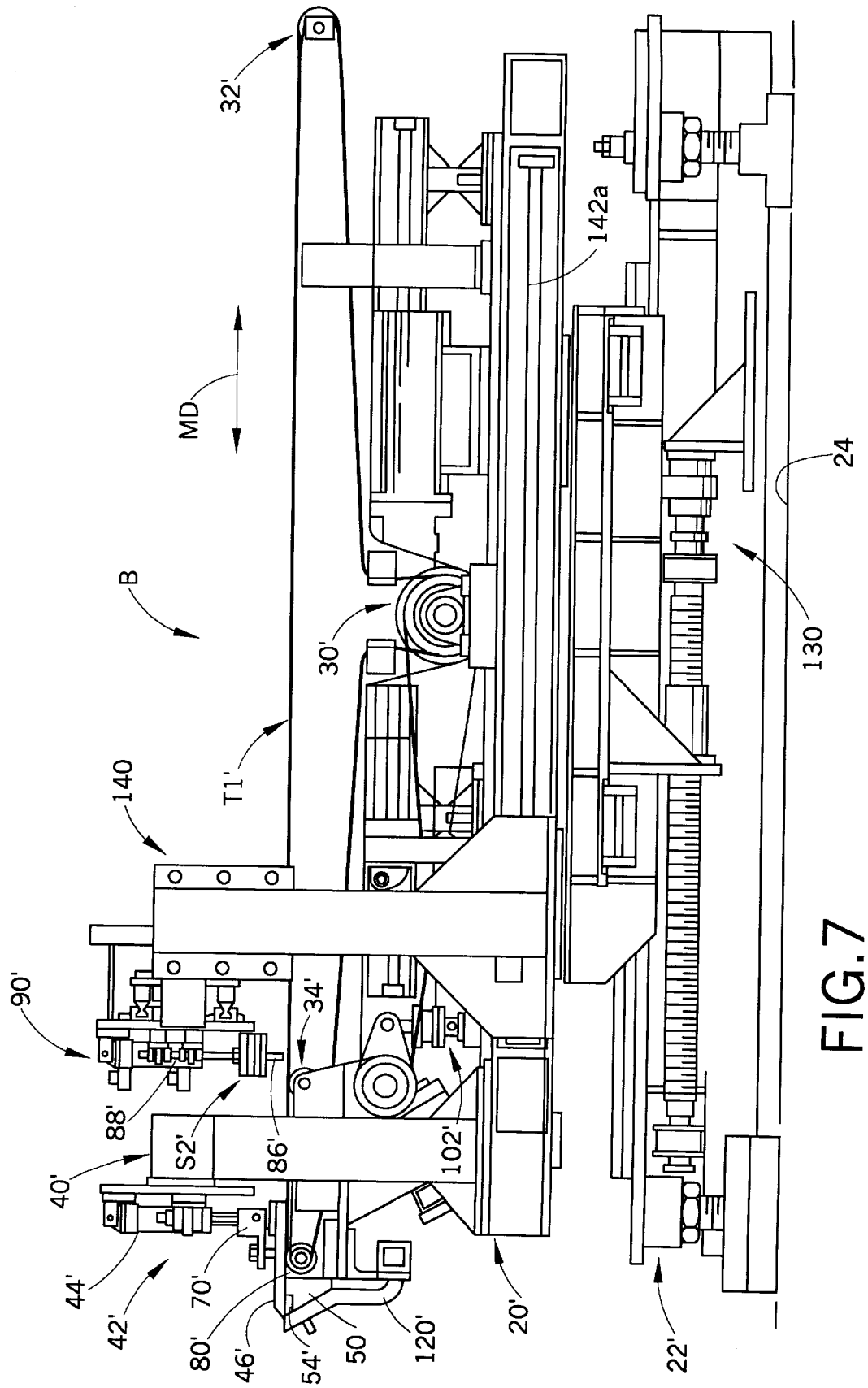
FIG. 7 is a side elevational view of a moving half of a laser cutting and welding apparatus in accordance with the present invention, the moving half and the stationary half together forming the conveying and fixturing apparatus.
Figure 8:
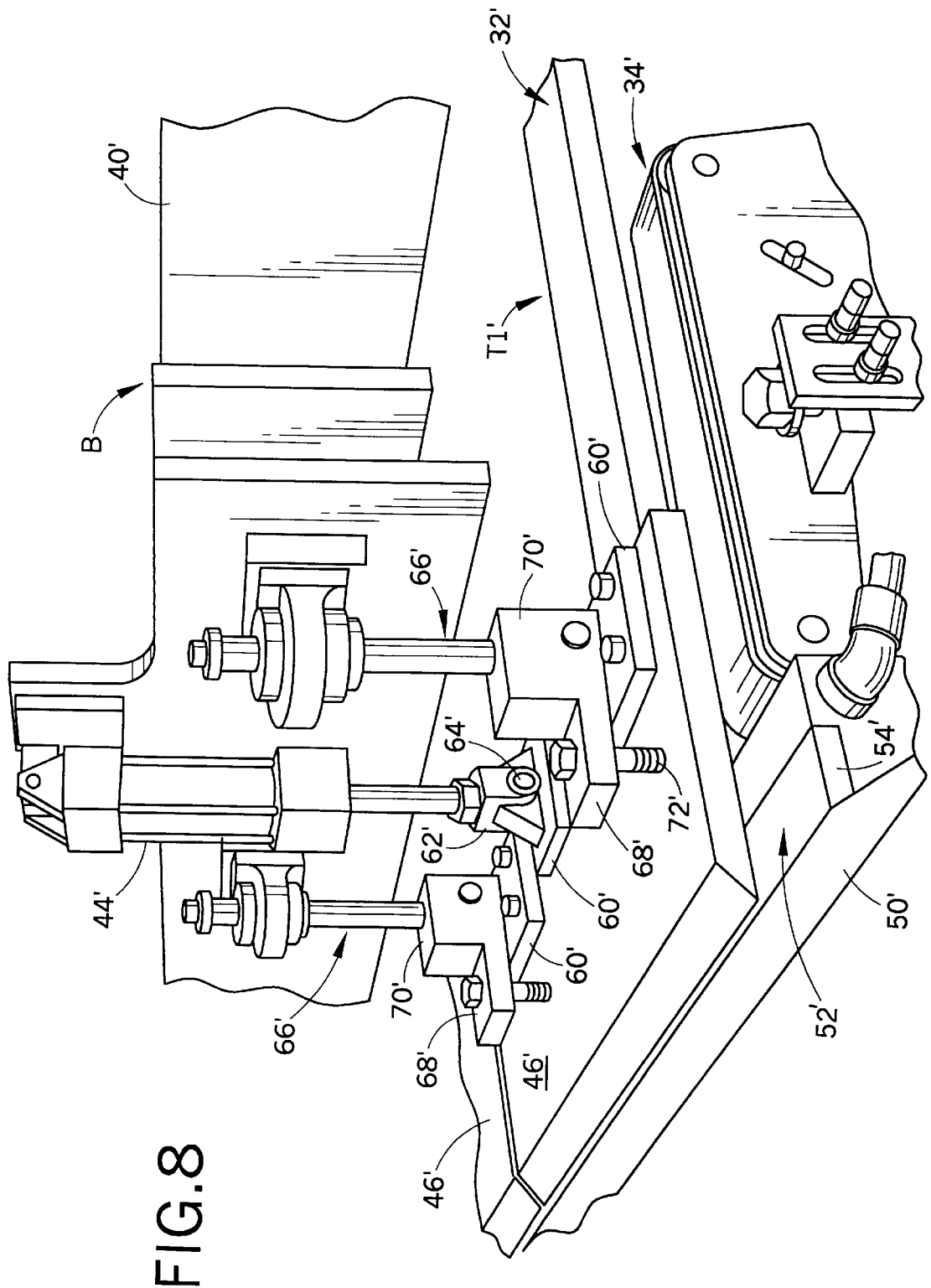
FIG. 8 is a partial perspective view of the moving half shown in FIG. 7.

FIGS. 7 and 8 illustrate a moving portion or "half" B of a laser cutting and welding apparatus in accordance with the present invention. The stationary half A and the moving half B utilize many of the same or similar components and operate in a similar fashion. Therefore, in the description of the moving half B, like components relative to the half A are indicated by like reference numbers having a primed (') suffix. For new components, new reference numbers are utilized.

The moving half B includes a frame 20' slidably supported above the shop floor 24 by a three-point base 22'. As is generally known in the field of machinery mounts, sliding movement of the half B on the machine direction axis MD is provided by a three-point mounting base 22' having a fixed mount that provides a pivot point, a sliding mount that slides on a single axis, and a floating mount that is free to move as required for the sliding operation of the moving half B. The frame 20' is therefore free to move in a reciprocal fashion on the machine direction axis MD. To provide the force needed to move the frame 20' in this manner, drive means 130, such as a servomotor, is provided and allows for highly accurate, feedback-controlled movement of the half B.

The moving half B also includes a conveyor drive source 30' driving one or more conveyors 32' and one or more pivotable crossover conveyors 34'. As with the stationary half A, it is preferable that a plurality of each of the conveyors 32',34' be provided in a laterally spaced manner across the width of the half B to move articles in the machine direction MD. The conveyors 32',34' are positioned adjacent each other and together define a transport surface T1' for moving workpieces and finished tailor welded blanks. Like the conveyors 32, the conveyors 32' are also selectively magnetized to increase their ability to convey sheet steel products without slippage.

The chassis 20' supports an overhead beam structure 40' that spans the width of the half B. The beam 40' carries a workpiece clamping assembly 42' on a forward side thereof. The clamping assembly 42' comprises at least one, and preferably a plurality, of actuators 44' operatively connected to one or more clamping plates 46'. The actuators 44' are preferably hydraulic, pneumatic, or other fluid cylinders, although other means, such as electric motors and the like, may alternatively be used. The workpiece clamping assembly 42' is constructed and operates in the same manner as the assembly 42 of the stationary half A to securely fix a workpiece in a cutting and/or welding position between the clamping plates 46' and a support member 50'. Further, the moving half B also includes clamping magnets 80' as described above to ensure that a clamped workpiece is unable to move.

With particular reference to FIG. 8, each clamping plate 46' includes one or more attachment members 60' securely connected thereto. Correspondingly, each actuator 44' includes a mating attachment member 62' positioned on a distal end thereof. A steel hinge pin 64' or the like pivotally interconnects the members 60',62', and thus, each clamping plate 46' with at least one actuator 44'. Guide rail assemblies 66', as described in relation to the half A, prevent any undesirable movement of the plates 46'. The guide rail assembly attachment members 70' also act to limit upward and downward pivotal movement of each plate 46' due to the stop member portion 68' and the stop pin 72'.

FIGS. 7 and 9–10B illustrate the workpiece sensing and position adjustment system of the moving half B which is similar to the system of the stationary half A. A workpiece rear edge sensing and positioning assembly S1' is positioned below the transport surface T1' and includes at least two gauge pins or sensors 56' to sense and control the position of a rear edge RE' (FIG. 13) of a second workpiece on the machine direction axis MD, i.e. the edge of a workpiece most distant from the half A. Also, a workpiece lateral edge sensor and positioning assembly S2' is provided to sense and adjust the lateral position of a workpiece on the transport surface T1'. The operation of the assembly S2' is similar in all respects to the assembly S2. Only its connection to the chassis 20' is different.

Figure 10B:
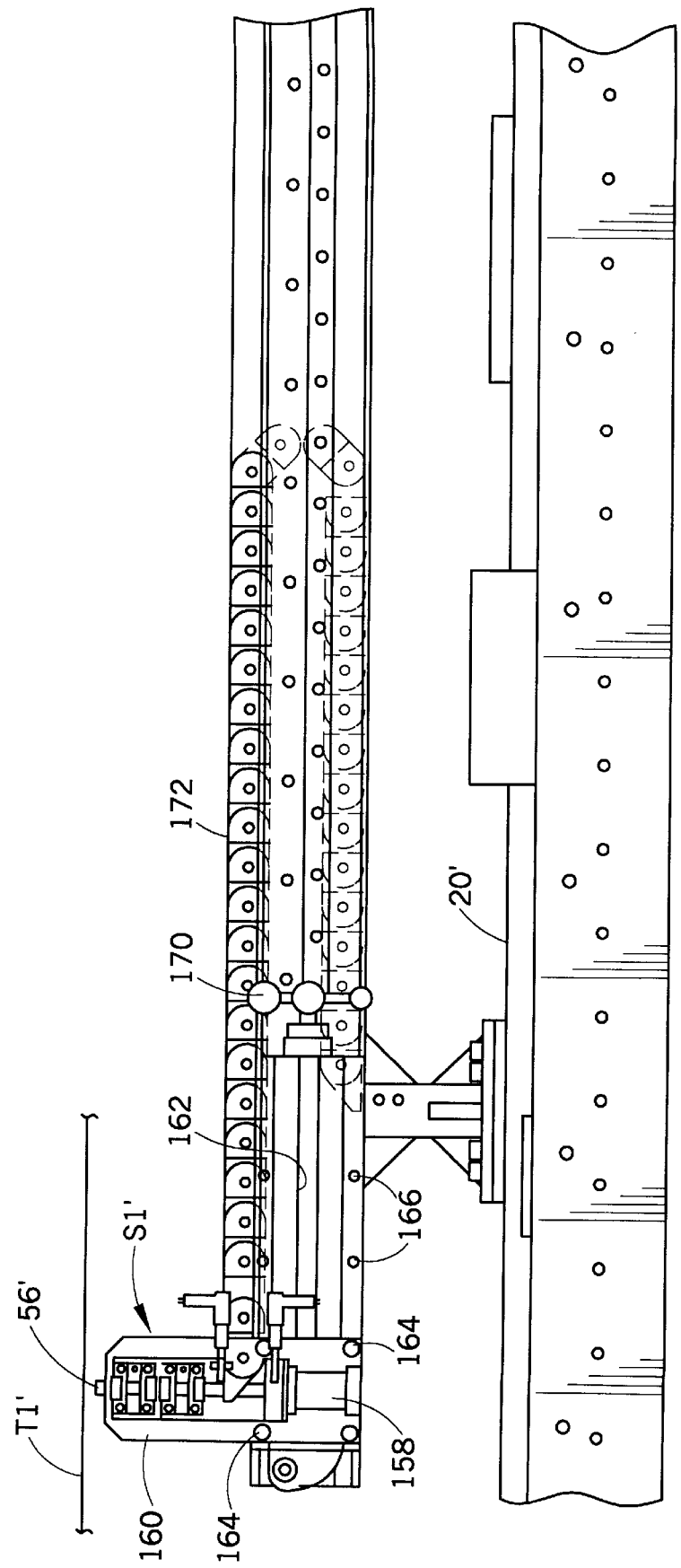
FIG. 10B is a partial side elevational view of the moving half of FIG. 7 showing a rear edge sensing and positioning assembly in accordance with the present invention.

More particularly, with reference to FIGS. 10A and 10B, the assembly S1' is provided beneath the transport surface T1' and supports at least two contact or noncontact sensors 56'. At least two laterally spaced sensors 56' are positioned in a retracted position beneath the surface T1' where the sensors 56' are protected from damage and do not interfere with movement of articles on the transport surface. They are selectively extensible from the storage position shown in FIG. 10B to an operative workpiece rear edge sensing position above the transport surface T1' to sense or gauge a rear edge RE' of a workpiece. An actuator 158 such as a fluid cylinder or the like selectively extends and retracts the sensors 56' as required. The sensor assembly S1' is provided to sense and control the position of a workpiece on the surface T1' along the machine direction axis MD. Thus, the axial position of the assembly S1' on the axis MD is also selectively varied so that when the sensors 56' are extended above the surface T1', a workpiece moving rearwardly (away from the half A) on the surface T1' is blocked by the sensors 56' at a known axial position.

Each sensor 56' of the assembly S1' is supported by a carriage 160 which is slidably connected to the chassis 20' by way of sliding tracks 162. The carriages 160 are preferably manually movable and fixed in position by coacting pins and holes 164,166 of the carriage and chassis, respectively. Once each carriage is fixed in a rough axial position, the axial position can be further precisely adjusted using a fine adjustment means such as an adjustment screw assembly controlled by an adjustment wheel 170 or any other suitable fine adjustment mechanism. The electrical cables associated with each sensor 56' are preferably housed in a flexible track assembly 172 which prevents the cables from becoming entangled in the nearby machinery. In this manner, the sensor assembly S1' is able to block further rearward axial movement of a workpiece at an exact and known location on the transport surface T1'.

Figure 9:
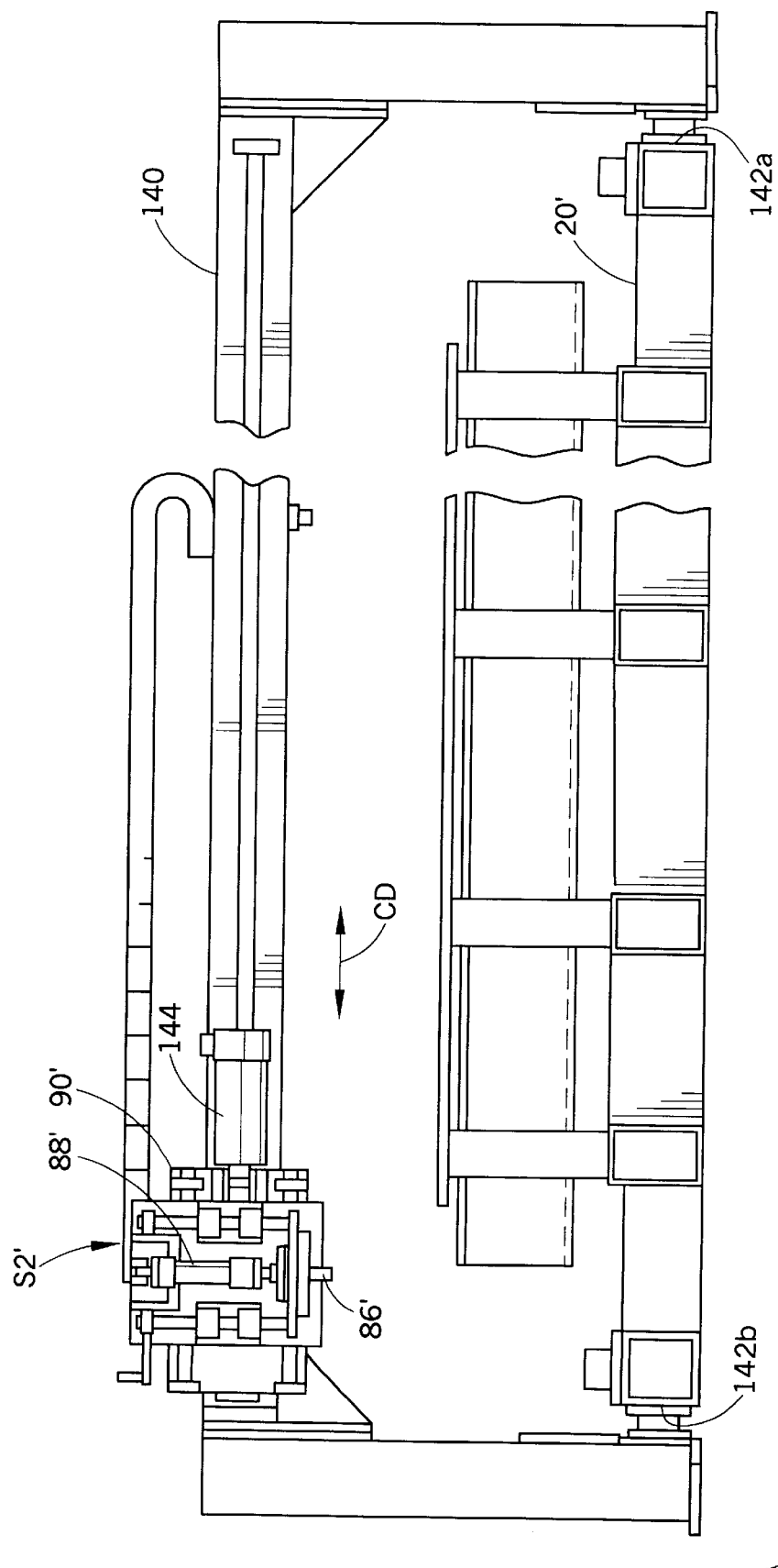
FIG. 9 is a front elevational view of a lateral edge sensor and positioning assembly of the moving half of FIG. 7.

The workpiece lateral edge sensor and position adjustment assembly S2' is shown most clearly in FIGS. 7 and 9 and is provided above the transport surface T1' in a manner similar to the assembly S2 of the stationary half A. However, rather than being supported by the beam 40', the assembly S2' is preferably supported by a second beam structure 140 spanning the width of the transport surface T1'. The frame 20' includes sliding tracks 142a,142b that slidably support the beam 140 relative thereto for sliding movement on the machine direction axis MD. The sliding movement of the beam 140 allows the axial position of the assembly S2' to be adjusted as needed to accommodate workpieces of different sizes and shapes.

As with the assembly S2, the assembly S2' includes a workpiece lateral edge gauge pin or sensor 86' connected to an actuator 88' that extends the sensor 86' downward toward the surface T1' into an operative position to sense and adjust the lateral position of a workpiece, and retracts the sensor 86' upward to a storage position that allows free workpiece movement and that protects the sensor 86' from damage. The actuator 88' and the sensor 86' are connected to a carriage 90' which is movable over the surface T1' the cross-machine direction CD. A servomechanism or motor 144 drives the carriage 90' as needed so that the sensor 86' is able to sense and adjust the lateral position of a workpiece. The servo-mechanism 144 provides for highly accurate, feedback-controlled movement of the carriage. As described above in relation to the stationary half A and the assembly S2, when the sensor 86' is in contact with a lateral edge of a workpiece, further movement of the carriage 90' toward the workpiece moves the workpiece accordingly on the surface T1'. For such workpiece lateral position adjustment operations, the selectively magnetized conveyors 32,32' are demagnetized so that a workpiece is able to move laterally over the surfaces T1,T1'. However, similar to the conveyors 32,34 described above, the conveyors 32',34' continue to drive the workpiece rearwardly into the sensors 56' of the assembly S1' during workpiece lateral position adjustment to ensure that the workpiece does not move on the machine direction axis MD during lateral position adjustment operations.

Figure 11B:
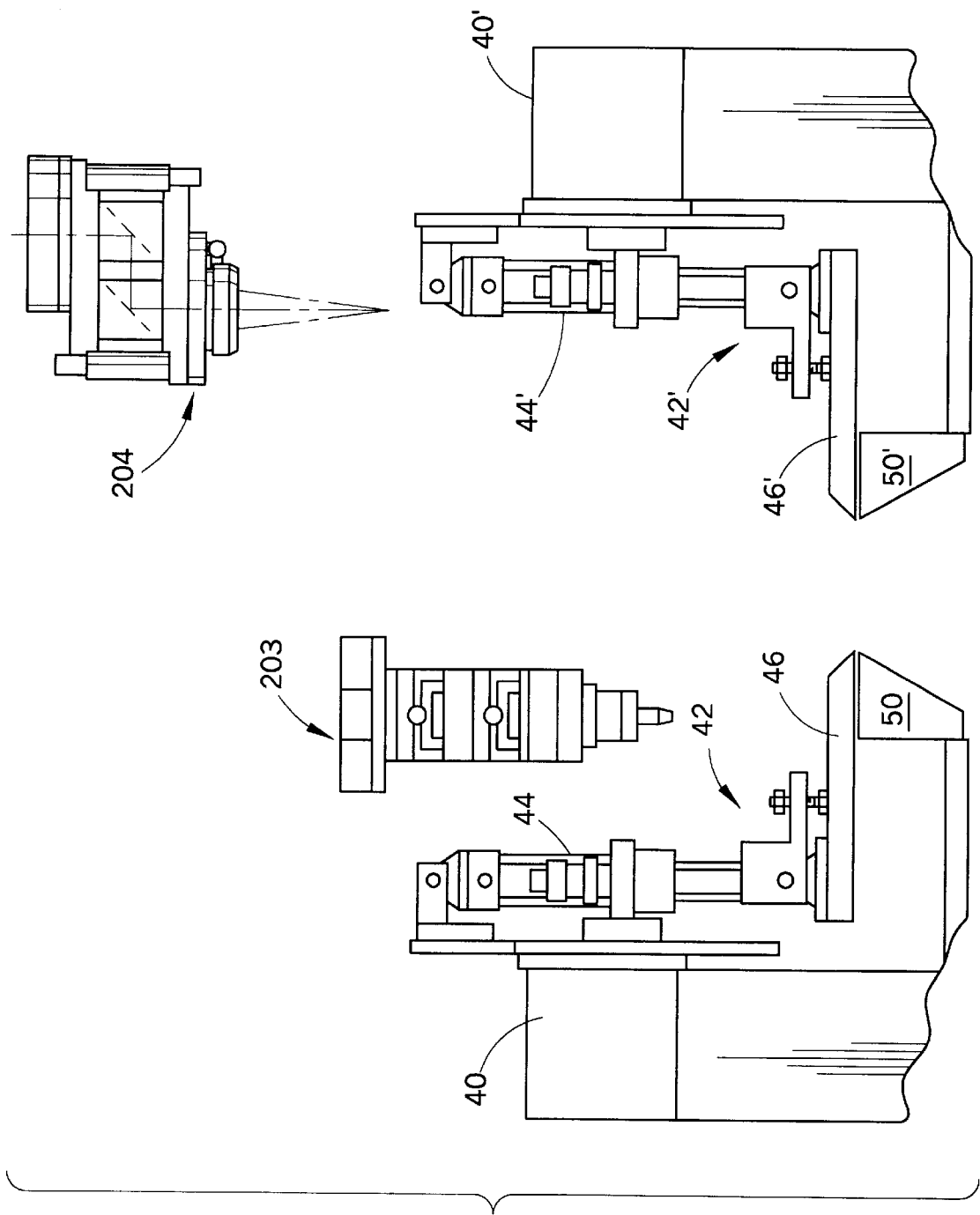
FIG. 11B is a partial side elevational view of the stationary and movable halves showing the laser cutting head and the laser welding head.

The conveyors 32',34' of the moving half B operate in the same manner as the conveyors 32,34 of the stationary half A. In FIG. 7, it can be seen that at least one actuator 102' is provided to pivot each crossover conveyor 34' between the ordinary transport position and a crossover position (FIG. 11A) whereby the conveyors are pivoted upward. FIGS. 7 and 11 also show the offal support assembly of the moving half B which is the same as the offal support assembly of the stationary half A. The offal support assembly includes a plurality of laterally spaced offal support arms 120' (FIG. 10) which are pivoted relative to the chassis 20' between the operative position (FIG. 7) for supporting an offal during cutting operations, and a storage position (FIG. 11A) for welding operations to prevent damage thereto.

FIGS. 10A and 11A show the arrangement of the halves A,B relative to each other such that they together form a laser cutting and blank welding apparatus in accordance with the present invention. In FIG. 10A, the front portion FP' of the moving half B is axially spaced from the front portion FP of the stationary half A for laser cutting operations to be carried out on a workpiece secured by the clamping assembly 42 and/or the clamping assembly 42'. This cutting position, where the halves A,B are separated, is achieved by operation of the servomotor 130. On the other hand, the servomotor 130 can also be operated to move the half B into a welding position where its front portion FP' is close to or in contact with the front portion FP of the half A as shown in FIG. 11A. FIG. 11A illustrates a tailor blank TB formed by the apparatus of the present invention being conveyed by the crossover conveyors 34,34' across a welding zone 150 to the surface of the half B after the cutting and welding operations have been completed. In the welding position, the half B is moved so that a forward edge FE' (FIG. 13) of a workpiece clamped by the workpiece clamping assembly 42' is moved into an abutting relationship with a forward edge FE of a workpiece supported by the half A and clamped by the assembly 42. It is important that the workpieces supported respectively by the halves A and B fit closely together in an abutting relationship. The servomotor 130 varies the pushing force and/or distance toward the half A depending upon the preferred mode of operation to ensure that the workpieces are precisely and firmly abutted.

The laser cutting and welding apparatus of the present invention is advantageous due to its ability to precisely manufacture workpieces. To this end, the workpieces are held by the clamping assemblies 42,42' during cutting so as to have mating edges. Thereafter the mating edge of the movable half is moved adjacent to the fixed edge into an abutting relationship for laser welding, without unclamping the workpieces between the edge cutting and laser welding operations. There are a variety of edge preparation methods that will provide mating edges as required. In a first method, a camera or other suitable edge contour sensing apparatus senses or captures the edge contour of one of the workpieces secured by one of the halves A,B. A laser cutting apparatus 204 cuts the edge of the other of the workpieces secured by the halves A,B to conform with the sensed edge. In a second mode of operation, both secured workpieces are cut to have mating curved edges. Finally, both workpieces can be cut to have nominally straight edges. In carrying out the first method, for example, a high resolution camera is used to capture an image of a workpiece edge so that the other workpiece can be cut in conformity therewith. Those skilled in the art will recognize that, for each batch of similar workpieces, the camera system need only be used once, with all other workpieces being identically cut.

Referring once again to FIG. 10A, the arrangement of the conveyors 32,34,32',34' can be seen. The half A includes a plurality of fixed conveyors 32 that receive a workpiece thereon and transport the same in a material flow direction MF. Crossover conveyors 34 of the half A are located toward the half B (at the forward portion FP) and communicate with the conveyors 32 to receive a workpiece therefrom. The conveyors 32,34 are preferably interleaved with one another as shown. Likewise, the half B includes a plurality of fixed conveyors 32' interleaved with a plurality of crossover conveyors located toward the half A so that they receive a workpiece or completed tailor welded blank from the crossover conveyors 34'. As is seen in FIG. 11A, the crossover conveyors 34,34' are required to transport articles over the welding zone 150, between the halves A,B, even when the halves A,B are moved adjacent in the welding position. Due to the welding operations, it is impracticable to span the zone 150 with conveyors.

Figure 12:
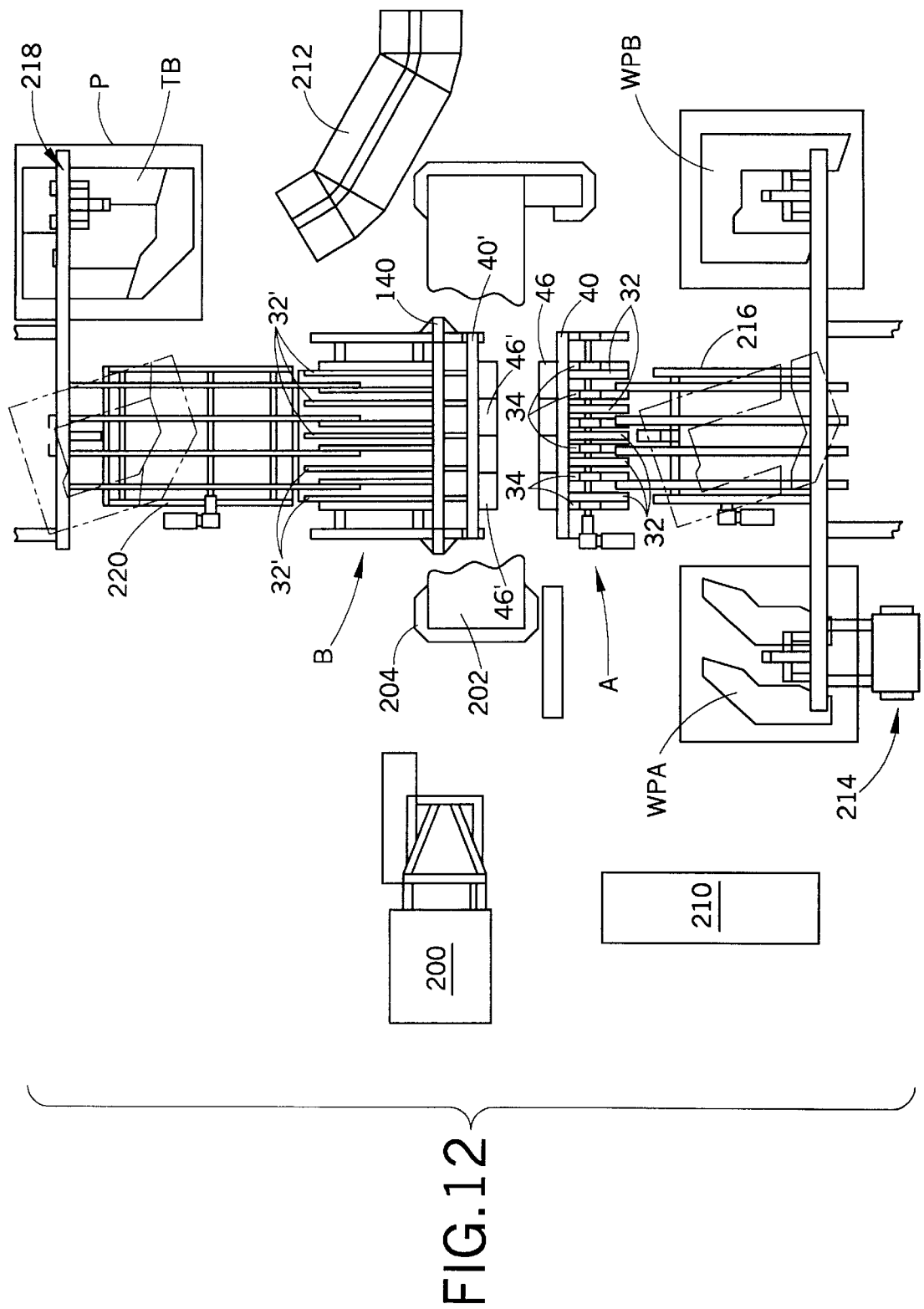
FIG. 12 is a top plan view of a laser cutting and welding apparatus and installation in accordance with the present invention including a stationary half and a moving half.

With reference now particularly to FIG. 12, a typical installation of a laser cutting and blank welding apparatus comprising the halves A,B in accordance with the present invention is shown. The halves A,B are arranged adjacent one another as described above with the half B being movable on the machine direction axis MD between the cutting and welding positions. The half A can be additionally or alternatively moveable relative to the half B. A laser source 200 supplies a laser beam either to a cutting head 203 or to a welding head 204, see FIG. 11B, supported by a gantry 202, depending upon which operation is to be performed. The heads 203,204 are each selectively movable into the operative position as required for cutting/welding operations, as appropriate. The laser beam source 200 may be any suitable laser source such as a TLF 6000 carbon-dioxide laser available commercially from Trumpf Incorporated. The laser beam source 200 provides a laser beam to either the cutting head 203 or to the welding head 204 which are movable in the cross-machine direction CD to, respectively, cut and weld workpieces secured by the halves A,B.

The necessary power supply and control electronics for powering and controlling machine operations are housed in a suitable enclosure 210 and an operator controls all machine operations from a control station 212. Various other conventional components required for laser cutting/welding operations in general, such as a chiller, a dust removal system, a scrap collection system, a laser control apparatus, and the like, also form a part of the installation.

The installation includes a source of first workpieces WPA and a source of second workpieces WPB which are to be welded together to form a tailor welded blank TB. A load gantry system 214 transports the workpieces WPA,WPB to an input conveyor 216 which communicates the parts WPA, WPB to the conveyor assembly 32 of the half A. Correspondingly, an unload gantry system 218 is provided to remove completed tailor blanks TB from an output conveyor 220 which receives the same from the conveyor assembly 32' of the half B.

Figure 13:
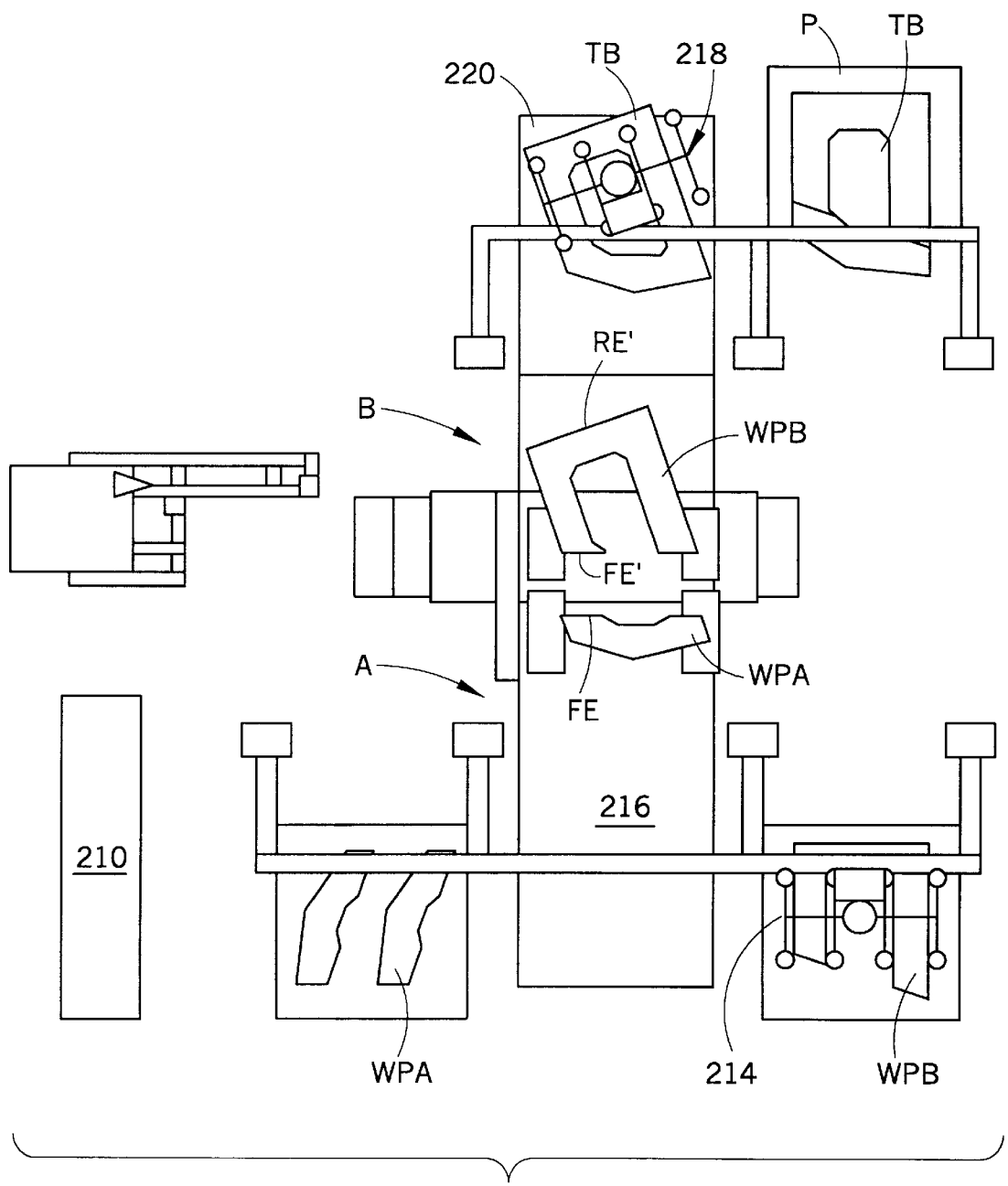
FIG. 13 is a top plan view diagrammatically illustrating a first state of a cutting and welding sequence in accordance with the present invention.

FIGS. 13–16 provide a general overview of laser cutting and blank welding operations in accordance with the present invention. In FIG. 13, the halves A,B are separated and in the cutting position. Workpieces WPA,WPB have been conveyed to their respective halves A,B while a just completed tailor blank TB is being lifted by the unload gantry 218 from the output conveyor 220 to be stacked on the pallet P. In FIG. 13, the parts WPA,WPB have not yet been properly positioned and clamped for cutting and welding operations.

Figure 14:
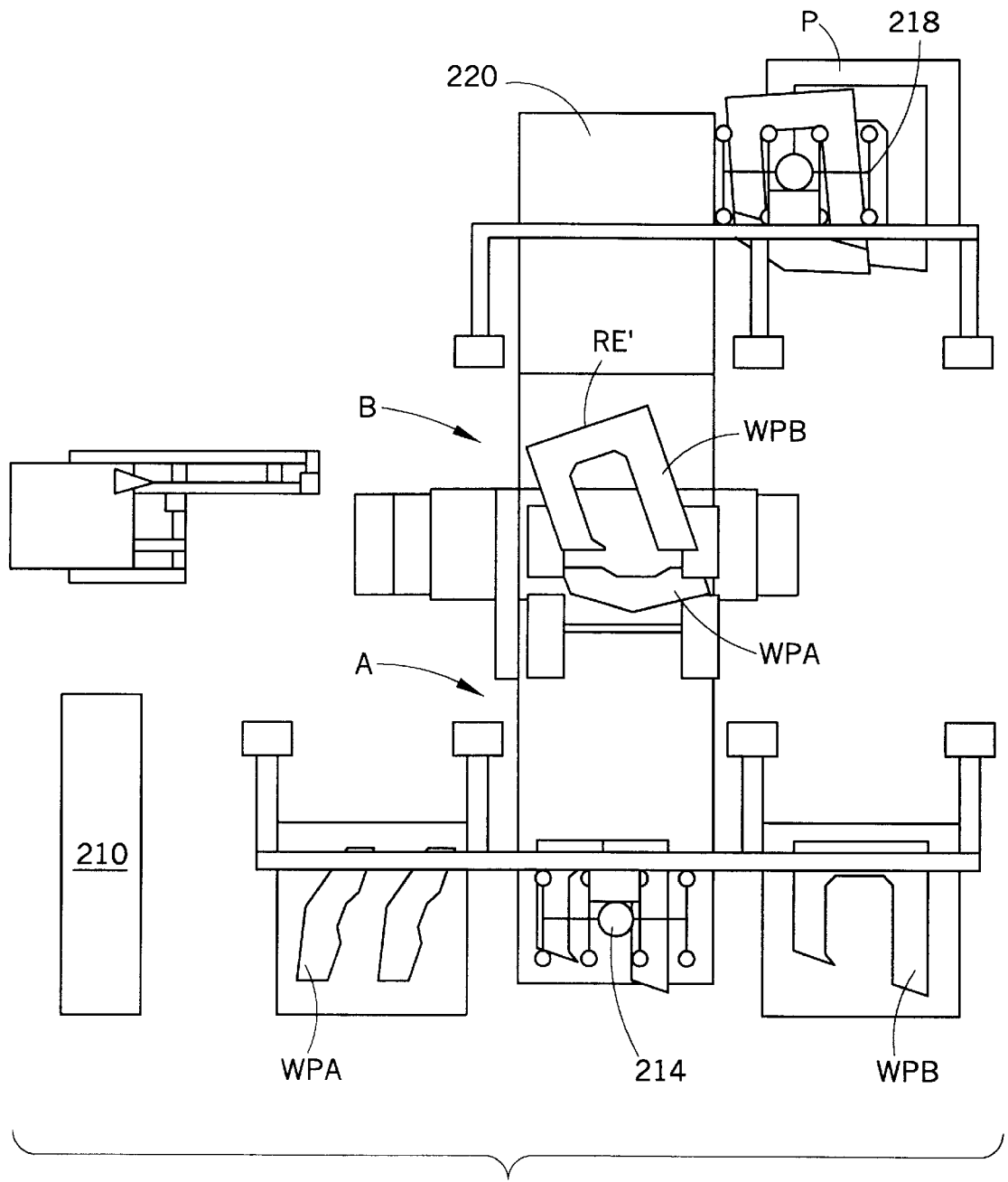
FIG. 14 is a top plan view diagrammatically illustrating a second state of a cutting and welding sequence in accordance with the present invention.

FIG. 14 illustrates the parts WPA,WPB clamped into position by the clamping assemblies 42,42' and magnets 80,80'. Simultaneously, additional workpieces WPA,WPB are being obtained by the load gantry system 214 while the unload gantry system 218 is stacking a completed tailor blank on a pallet P.

Figure 15:
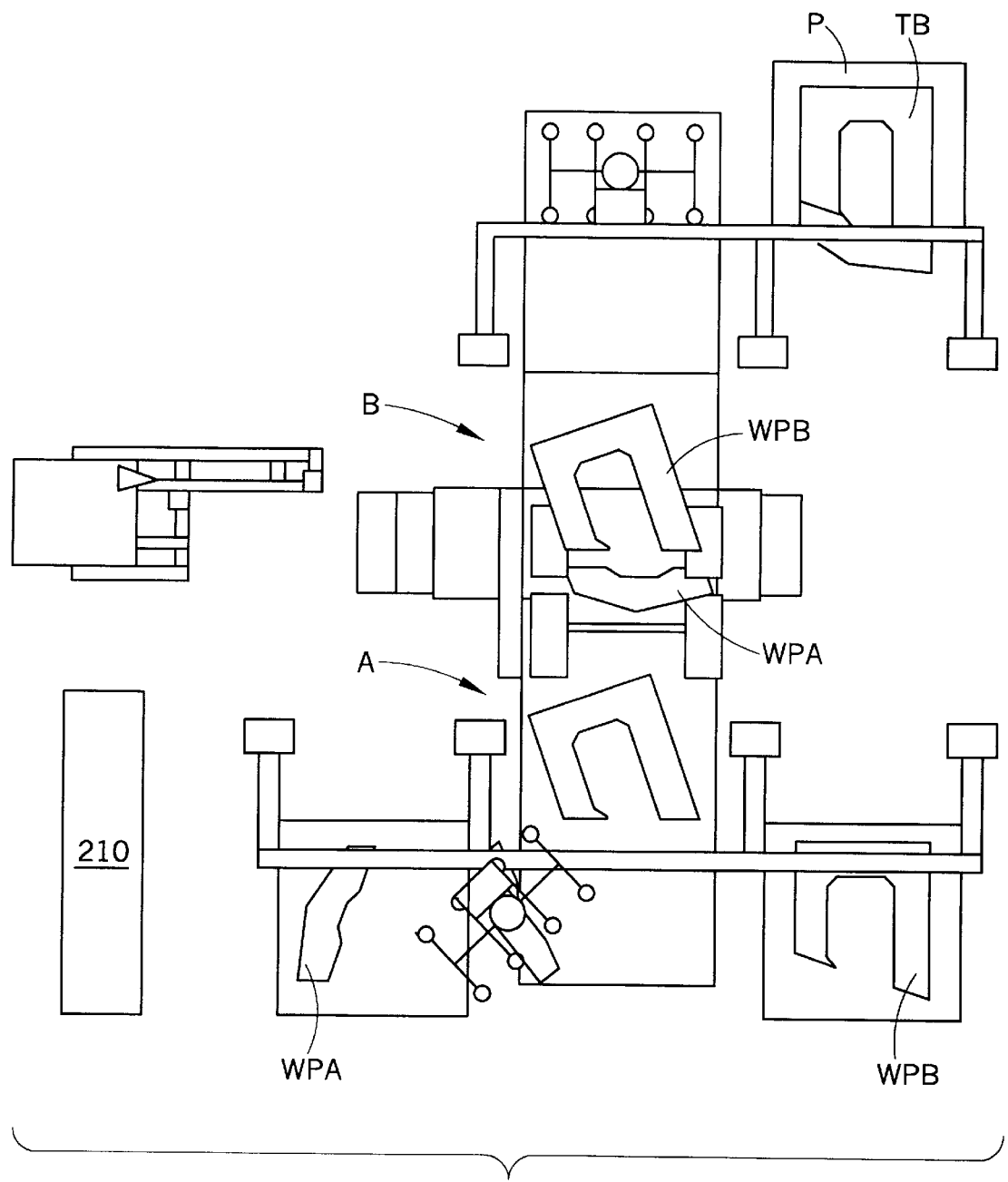
FIG. 15 is a top plan view diagrammatically illustrating a third state of a cutting and welding sequence in accordance with the present invention.
Figure 16:
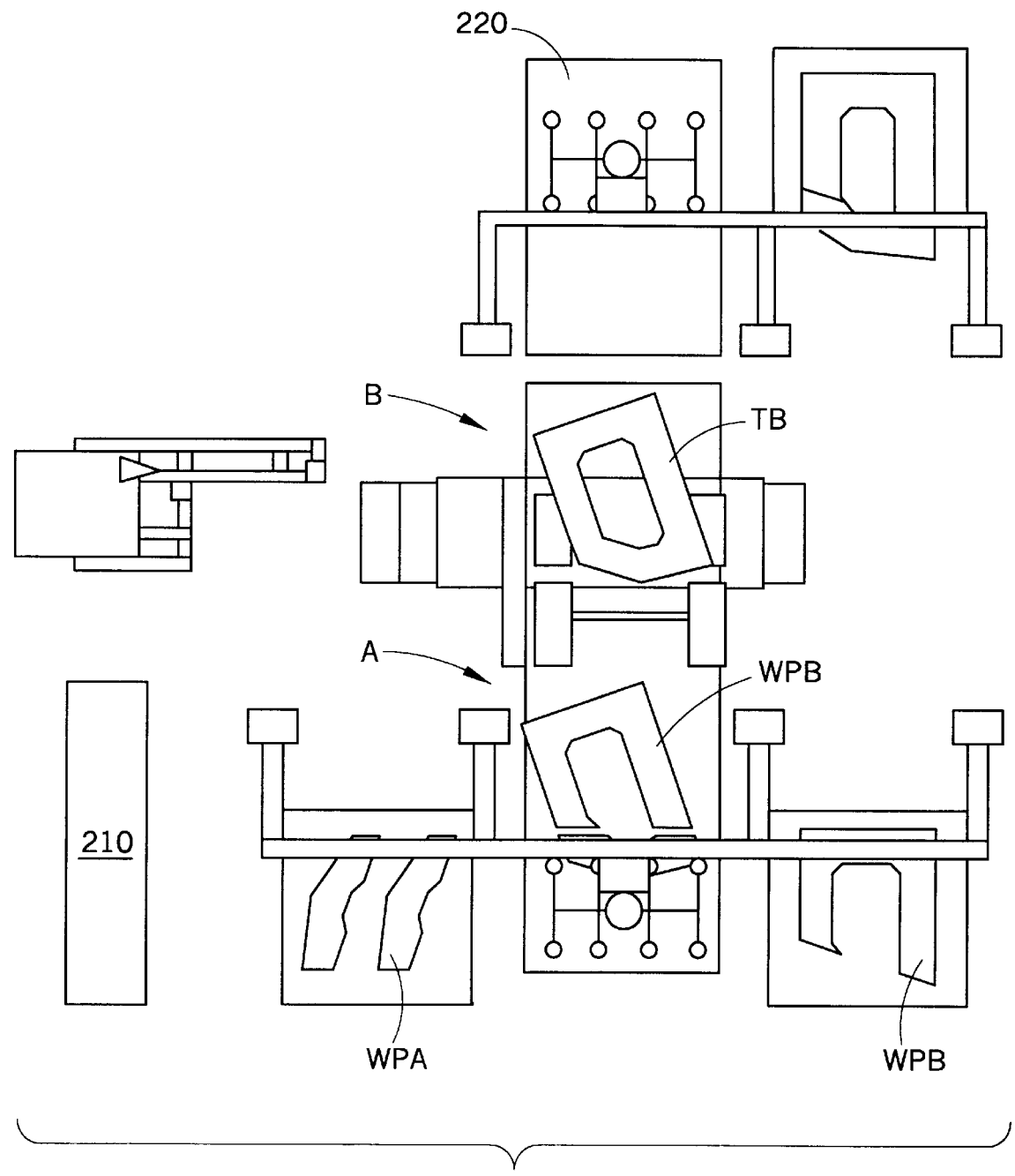
FIG. 16 is a top plan view diagrammatically illustrating a fourth state of a cutting and welding sequence in accordance with the present invention; and, FIGS. 17A, 17B, and 17C, together forming

In FIG. 15, a laser cutting operation is being carried out, while in FIG. 16, the half B has moved into the welding position adjacent the half A (note that in moving toward the half A, the half B has separated from the output conveyor 220). The parts WPA,WPB are being welded together to form a tailor welded blank TB.

Figure 17A:
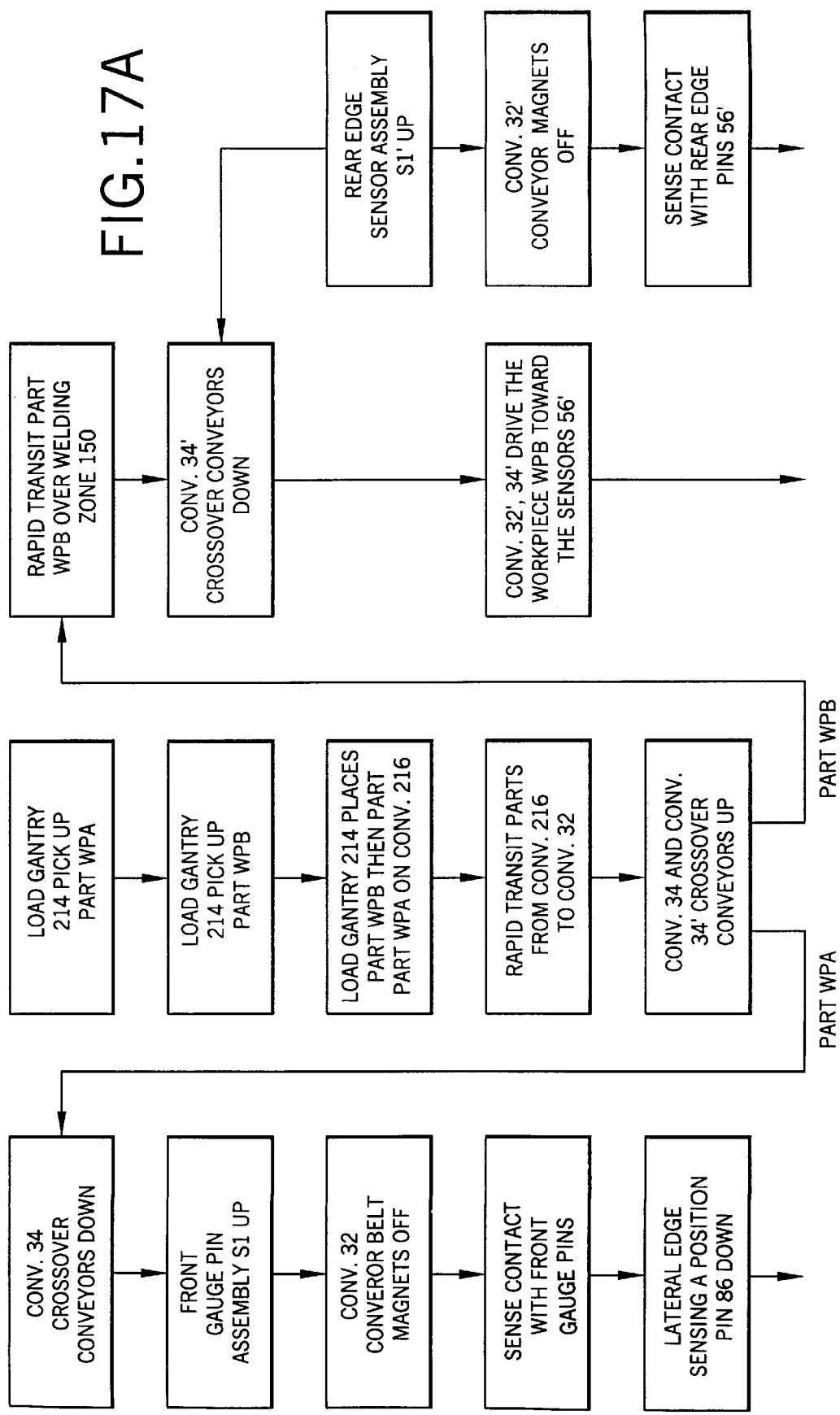
FIG. 17, are flow charts illustrating a laser cutting and blank welding method of the present invention.
Figure 17B:
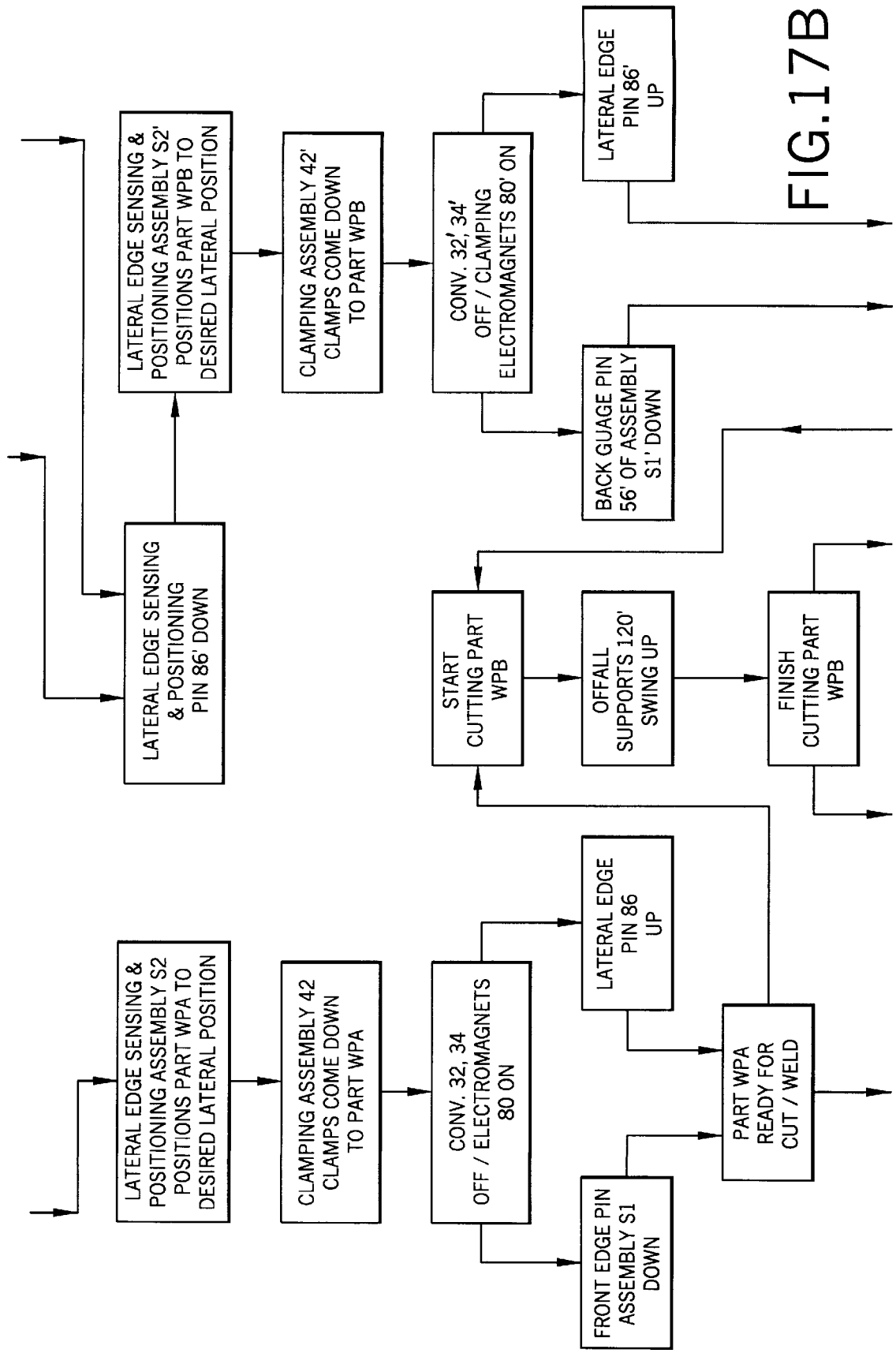

FIGS. 17A–17C provide a flow chart diagram of the above-described laser cutting and blank welding operations. Initially, the load gantry system 214 picks up a part WPA and thereafter a part WPB. The parts WPB and then WPA are placed on the input conveyor 216 by the load gantry system 214. The parts WPA,WPB are rapidly conveyed to the conveyor assembly 32 of the half A.

The crossover conveyor assemblies 34,34' are pivoted up to the crossover position and the part WPB is conveyed over the welding zone 150 separating the conveyors 34,34'. The crossover conveyors 34,34' are then lowered to the ordinary transport position.

With particular reference now to the part WPA and the machine half A (the left portion of the flow chart), the front edge sensor assembly S1 is pivoted up so that the front edge gauge pins 56 supported thereby are in the operative position. The magnets of the conveyor assembly 32 are turned off. The conveyors are advanced to move the workpiece WPA toward the sensors 56 until the workpiece contacts the sensors 56. Thereafter, while the demagnetized conveyors 32 continue to drive the workpiece WPA into the pins 56, the lateral edge sensing and positioning assembly S2 is deployed and the lateral edge gauge pin 86 thereof is extended to the operative position. The assembly S2 shifts the lateral position of the part WPA until the part is the desired lateral position. The clamping assembly 42 is then moved to the clamping position to secure the workpiece in position. Also, the clamping magnets 80 are energized.

Similarly, with respect to the part WPB and the machine half B (the right portion of the flow chart), the rear edge gauge pins 56' of the assembly S1' are extended above the transport surface T1' so that the pins 56' are operatively positioned to sense the rear edge RE' of the workpiece WPB. The conveyor magnets 32' are turned off and the conveyors 32' and 34' are translated back, away from the half A into the pins 56' until the sensors 56' sense contact with the rear edge RE' of the workpiece WPB. Thereafter, the lateral edge sensing and positioning gauge pin 86' is extended to the operative position and the assembly S2' is operated to move the part WPB to the desired lateral position on the surface T1' while the demagnetized conveyors 32' continue to drive the workpiece WPB into the sensors 56'. Once positioned as desired, the part WPB is clamped into position by the clamping assembly 42' and the associated clamping magnets 80'.

Once the parts WPA,WPB are fixed in position, the sensors assemblies S1,S2,S1',S2' retract the pins 56,86,56', 86', respectively, to protect the same from damage from cutting and welding operations. Thus, the assemblies S1,S1' are pivoted downward and the assemblies S2,S2' retract the sensors 86,86'.

To cut the part WPB, the offal supports 120' of the half B are pivoted upward into the position to support the offal. The laser source 200 and cutting head 203 cooperate to cut the part WPB. If the part WPA is also to be cut, the offal supports 120 of the half A are likewise pivoted into position to support the offal and the part A is also cut. Whether one or both of parts WPA,WPB are cut, it is critical the parts fit together precisely when in an abutting relationship for subsequent welding operations. After cutting operations, the offal supports 120,120' are pivoted downward and any offal supported respectively thereby is dropped to the shop floor 24 or into a scrap bin.

For welding operations, the half B moves into the welding position so that the parts WPA,WPB abut along a welding seam. It should be noted that neither part WPA,WPB is unclamped between cutting and welding operations. This ensures a precise alignment of the parts along the welding seam. The servomotor moving the half B senses resistance when the parts WPA,WPB touch. This indicates the parts are properly positioned for welding. Alternatively, the part WPB clamped by the movable half B may be used to push the part WPA clamped by the fixed half A a small distance (e.g., 1 mm) to assure good abutment. In such alternative mode of operation, the magnets 80 securing the part WPA are turned completely "off" to allow the slight movement of the part WPA. The welding head 204 is then moved to a welding position and the laser beam source 200 is activated so that the parts WPA,WPB are welded together to produce a blank TB. The blank TB is then freed by deenergizing the clamping magnets 80,80' and by opening the clamping assemblies 42,42'. The crossover conveyors 34,34' are again pivoted up and activated to convey the blank TB over the welding zone 150 and onto the conveyor assembly 32' of the half B. From there, the completed blank TB is conveyed to the output conveyors assembly 220 to be stacked by the unload gantry system 218 onto a pallet P.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

Having thus described the preferred embodiments, the invention is now claimed to be:

1. A laser cutting and blank welding apparatus for fabricating a tailor welded blank from at least first and second sheet metal workpieces, said apparatus comprising:

first and second machine halves, at least one of said first and second halves being movable along a first axis relative to the other of said first and second halves so that a forward portion of said first half and a forward portion of said second half are selectively positioned in one of an axially spaced cutting relationship for cutting operations and an axially adjacent welding relationship for welding operations, each of said halves including:

a transport surface for moving an associated workpiece on said first axis, a first sensing and positioning assembly for sensing and controlling the position of the associated workpiece on said first axis, a lateral sensing and positioning assembly for sensing and controlling a lateral position of the associated workpiece on the transport surface, and a workpiece clamping assembly located at said forward portion for securely clamping the associated workpiece to prevent movement thereof and such that adjacent edges of two associated workpieces clamped respectively by said first and second halves abut when said halves are in said welding relationship;

a laser beam cutting and welding device supported above and axially between said first and second halves for cutting at least one of the two associated workpieces when said first and second halves are in said cutting relationship so that the adjacent edges of the two associated workpieces mate when said halves are positioned in said welding position, said laser beam cutting and welding device further welding the two associated workpieces together along the adjacent edges of the two associated workpieces when said halves are in said welding position; and, an offal support assembly selectively positioned adjacent a front edge of at least one of said first and second halves when said first and second halves are positioned in said cutting relationship said offal support assembly adapted for supporting an offal generated by said cutting operations.

2. The laser cutting and blank welding apparatus as set forth in claim 1 wherein said transport surface of each of said first and second halves is selectively magnetized.

3. The laser cutting and welding apparatus as set forth in claim 1, wherein said workpiece clamping assembly of each of said first and second halves comprises:

a laterally extending support member at said forward portion for supporting a lower surface of an associated sheet metal workpiece;

at least one clamping plate located above said support member and movable between an unclamped position allowing movement of the associated sheet metal workpiece relative to said support member and a clamped position wherein the associated workpiece is immovably fixed between said support member and said at least one clamping plate.

4. The laser cutting and welding apparatus as set forth in claim 3 comprising a plurality of clamping plates each individually movable between said clamped and unclamped positions.

5. The laser cutting and welding apparatus as set forth in claim 3 wherein said at least one clamping plate pivots about a horizontal axis when moving between said unclamped and clamped positions, said at least one clamp urging the associated sheet metal workpiece both downward and forward when moving from said unclamped position to said clamped position.

6. The laser cutting and welding apparatus as set forth in claim 3 wherein said workpiece clamping assembly of each of said first and second halves further comprises at least one selectively energized clamping magnet positioned to magnetically urge said at least one clamping plate toward said support member when said clamping magnet is energized.

7. A laser cutting and blank welding apparatus for fabricating a tailor welded blank from at least first and second sheet metal workpieces, said apparatus comprising:

first and second machine halves, at least one of said first and second halves being movable along a first axis relative to the other of said first and second halves so that a forward portion of said first half and a forward portion of said second half are selectively positioned in one of an axially spaced cutting relationship for cutting operations and an axially adjacent welding relationship for welding operations, each of said halves including:

a transport surface for moving an associated workpiece on said first axis, a first sensing and positioning assembly for sensing and controlling the position of the associated workpiece on said first axis, a lateral sensing and positioning assembly for sensing and controlling a lateral position of the associated workpiece on the transport surface, and a workpiece clamping assembly located at said forward portion for securely clamping the associated workpiece to prevent movement thereof and such that adjacent edges of two associated workpieces clamped respectively by said first and second halves abut when said halves are in said welding relationship;

a laser beam cutting and welding device supported above and axially between said first and second halves for cutting at least one of the two associated workpieces when said first and second halves are in said cutting relationship so that the adjacent edges of the two associated workpieces mate when said halves are positioned in said welding position, said laser beam cutting and welding device further welding the two associated workpieces together along the adjacent edges of the two associated workpieces when said halves are in said welding position; and, a tiltable crossover conveyor assembly adjacent said forward portion of at least one of said first and second machine halves, said tiltable crossover conveyor assembly adapted for being selectively positioned in one of a horizontal transport position for moving associated sheet metal workpieces on said transport surface of said at least one of said first and second machine halves along said first axis and an upwardly tilted crossover position for moving sheet metal workpieces from said at least one of said first and second machine halves to the other of said first and second machine halves.

8. The laser cutting and welding apparatus as set forth in claim 7 wherein said transport surface of each of said first and second halves includes a tiltable crossover conveyor assembly respectively adjacent said forward portion thereof, said crossover conveyor assemblies communicating associated sheet metal workpieces between said transport surfaces of said first and second halves when in said upwardly tilted crossover position.

9. A laser cutting and blank welding apparatus adapted for fabricating a tailor welded blank from at least first and second sheet metal workpieces, said apparatus comprising:

first and second machine halves, at least one of said first and second halves being movable alone a first axis relative to the other of said first and second halves so that a forward portion of said first half and a forward portion of said second half are selectively positioned in one of an axially spaced cutting relationship for cutting operations and an axially adjacent welding relationship for welding operations, each of said halves including:

a transport surface for moving an associated workpiece on said first axis, a first sensing and positioning assembly for sensing and controlling the position of the associated workpiece on said first axis, a lateral sensing and positioning assembly for sensing and controlling a lateral position of the associated workpiece on the transport surface, and a workpiece clamping assembly located at said forward portion for securely clamping the associated workpiece to prevent movement thereof and such that adjacent edges of two associated workpieces clamped respectively by said first and second halves abut when said halves are in said welding relationship; and, a laser beam cutting and welding device supported above and axially between said first and second halves for cutting at least one of the two associated workpieces when said first and second halves are in said cutting relationship so that the adjacent edges of the two associated workpieces mate when said halves are positioned in said welding position, said laser beam cutting and welding device further welding the two associated workpieces together along the adjacent edges of the two associated workpieces when said halves are in said welding position, wherein:

said first sensing and positioning assembly of said first half comprises at least two sheet metal workpiece edge sensors connected to a tiltable arm at said forward portion of said first half such that said at least two sensors are selectively tiltable between an operative position for sensing and blocking movement on said first axis of a forward edge of a workpiece positioned on said transport surface and a storage position; and said lateral sensing and positioning assembly of said first half includes at least one sheet metal workpiece lateral edge sensor supported by a carriage, said carriage being movable laterally on a second axis perpendicular to said first axis.

10. The laser cutting and welding apparatus as set forth in claim 9 wherein:

said first sensing and positioning assembly of said second half comprises at least two sheet metal workpiece edge sensors selectively positioned to block movement of a sheet metal workpiece along the first axis on said transport surface at a known location on said first axis; and, said lateral sensing and positioning assembly of said second half includes at least one sheet metal workpiece lateral edge sensor supported by a carriage located above said transport surface of said second half, said carriage being movable on a second axis perpendicular to said first axis.

11. A laser cutting and blank welding apparatus for fabricating a tailor welded blank from first and second sheet metal workpieces, said apparatus comprising:

first and second machine halves, at least one of said first and second halves being movable along a first axis relative to the other of said first and second halves so that a forward portion of said first half and a forward portion of said second half are selectively positioned in one of an axially spaced cutting relationship for cutting operations and an axially adjacent welding relationship for welding operations, each of said halves including:

a transport surface for moving an associated workpiece on said first axis, a first sensing and positioning assembly for sensing and controlling the position of the associated workpiece on said first axis, a lateral sensing and positioning assembly for sensing and controlling a lateral position of the associated workpiece on the transport surface, and a workpiece clamping assembly located at said forward portion for securely clamping the associated workpiece to prevent movement thereof and such that adjacent edges of two associated workpieces clamped respectively by said first and second halves abut when said halves are in said welding relationship; and, a laser beam cutting and welding device supported above and axially between said first and second halves for cutting at least one of the two associated workpieces when said first and second halves are in said cutting relationship so that the adjacent edges of the two associated workpieces mate when said halves are positioned in said welding position, said laser beam cutting and welding device further welding the two associated workpieces together along the adjacent edges of the two associated workpieces when said halves are in said welding position; and, a servomotor connected to said at least one movable first and second half and adapted for providing feedback controlled movement of said at least one movable half on said first axis.

12. A method of cutting and welding sheet metal blanks, said method comprising the steps of:

fixedly securing first and second sheet metal workpieces to respective first and second spaced apart support members at known locations on a first axis and on a second axis transverse to said first axis, said step of fixedly securing including:

moving said first and second workpieces in a first direction on said first axis by exerting respective axial forces thereon;

blocking movement of each of said first and second workpieces at respective known axial positions on said first axis while continuing to exert said respective axial forces thereon to prevent movement of said workpieces in a second direction opposite to said first direction;

while exerting said respective axial forces on said first and second workpieces, moving each of said first and second workpieces in a lateral direction, transverse to said first direction;

terminating the respective axial forces exerted on said first and second workpieces; and, immovably fixing said first and second workpieces in position;

cutting at least one of said immovably positioned first and second workpieces such that said first and second workpieces have mating adjacent edges;

without unsecuring said first and second workpieces relative to their respective support members, moving at least one of said first and second support members into an axially adjacent relationship with the other such that said adjacent edges of said workpieces mate to form a welding joint; and, welding said workpieces together along said welding joint to form a tailor welded blank.

13. The cutting and welding method as set forth in claim 12 wherein said welding step comprises autogenous laser welding.

14. The cutting and welding method as set forth in claim 12 wherein said step of securing said first and second workpieces includes magnetically clamping said workpieces.

15. The cutting and welding method as set forth in claim 12 wherein the step of cutting at least one of said workpieces comprises the subsidiary step of sensing a contour of a forward edge of one of said workpieces and cutting the other of said workpieces to have a forward edge that mates with the sensed forward edge.

16. The cutting and welding method as set forth in claim 12 wherein the step of cutting at least one of said workpieces comprises the subsidiary step of cutting both of said workpieces to have mating forward edges.

17. The cutting and welding method as set forth in claim 12 wherein the step of cutting at least one of said workpieces comprises the subsidiary step of cutting both of said workpieces to have nominally straight forward edges.

* * * * *